(12) United States Patent
Hada et al.

(10) Patent No.: US 9,500,887 B2
(45) Date of Patent: Nov. 22, 2016

(54) METHOD AND APPARATUS FOR THE CONTINUOUS MANUFACTURE OF LIQUID CRYSTAL DISPLAY DEVICES

(75) Inventors: Kazuya Hada, Ibaraki (JP); Satoshi Hirata, Ibaraki (JP); Seiji Kondo, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 618 days.

(21) Appl. No.: 13/513,832

(22) PCT Filed: Dec. 22, 2010

(86) PCT No.: PCT/JP2010/073192
§ 371 (c)(1),
(2), (4) Date: Jun. 4, 2012

(87) PCT Pub. No.: WO2011/078253
PCT Pub. Date: Jun. 30, 2011

(65) Prior Publication Data
US 2012/0241077 A1  Sep. 27, 2012

(30) Foreign Application Priority Data
Dec. 25, 2009 (JP) .................................. 2009-296110

(51) Int. Cl.
*B32B 38/10* (2006.01)
*G02F 1/13* (2006.01)
(Continued)

(52) U.S. Cl.
CPC ........... *G02F 1/1303* (2013.01); *B32B 37/025* (2013.01); *B32B 38/10* (2013.01);
(Continued)

(58) Field of Classification Search
CPC ... B32B 37/12; B32B 41/00; B32B 2041/04; B65C 2009/0009; B65C 2009/0012; B65C 2009/0093; B65C 2009/402; B65C 2009/404; G02F 1/1303; G02F 1/133528

USPC .......... 156/64, 247, 249, 281, 289, 297, 299
See application file for complete search history.

(56) References Cited

U.S. PATENT DOCUMENTS

| 5,229,587 A | 7/1993 | Kimura et al. |
| 7,022,204 B2 | 4/2006 | Kanbara et al. |

(Continued)

FOREIGN PATENT DOCUMENTS

| CN | 1470890 A | 1/2004 |
| JP | 2633726 | 7/1997 |

(Continued)

OTHER PUBLICATIONS

Chinese Office Action for application No. 201080058629.1 dated May 12, 2014.

(Continued)

*Primary Examiner* — George Koch
(74) *Attorney, Agent, or Firm* — Hauptman Ham, LLP

(57) ABSTRACT

The present invention provides a method and apparatus designed to, during continuous manufacture of liquid crystal display panels, feed only a normal sheet to a lamination position for lamination to a rectangular panel and continuously laminate them together while positionally aligning them with each other. In the present invention, plural devices making up the entire apparatus are cooperatively associated with each other to make it possible that, among plural polarizing film sheets comprising a defect-free normal sheet and a defect-containing defective sheet each formed on a carrier film comprised in a strip-shaped film laminate. The normal sheet is reliably peeled from the carrier film by cooperatively associating feeding of the strip-shaped film laminate with a normal-sheet peeling device, and the defective sheet is reliably taken up while being attached to the carrier film, by cooperatively associating the feeding of the strip-shaped film laminate with a defective-sheet path changing device.

20 Claims, 15 Drawing Sheets

(51) Int. Cl.
*G02F 1/1335* (2006.01)
*B32B 37/00* (2006.01)
*B32B 38/18* (2006.01)

(52) U.S. Cl.
CPC ..... *G02F1/133528* (2013.01); *B32B 37/0053* (2013.01); *B32B 38/1825* (2013.01); *B32B 2309/72* (2013.01); *B32B 2457/202* (2013.01)

(56) References Cited

U.S. PATENT DOCUMENTS

| | | |
|---|---|---|
| 7,543,621 B2 | 6/2009 | Kanbara et al. |
| 2005/0016670 A1 | 1/2005 | Kanbara et al. |
| 2005/0274458 A1* | 12/2005 | Carver et al. ............... 156/344 |
| 2006/0124248 A1 | 6/2006 | Kanbara et al. |
| 2006/0144521 A1* | 7/2006 | Esposito et al. ............ 156/361 |
| 2009/0218049 A1 | 9/2009 | Kanbara et al. |
| 2010/0283943 A1 | 11/2010 | Kimura et al. |
| 2010/0288420 A1 | 11/2010 | Kimura et al. |
| 2010/0288432 A1 | 11/2010 | Kitada et al. |
| 2010/0316817 A1 | 12/2010 | Kimura et al. |
| 2011/0061801 A1 | 3/2011 | Kitada et al. |

FOREIGN PATENT DOCUMENTS

| | | |
|---|---|---|
| JP | 2004-361741 A | 12/2004 |
| JP | 2005-271437 | 10/2005 |
| JP | 2009-186994 | 8/2009 |
| JP | 4377961 | 12/2009 |
| JP | 4377964 | 12/2009 |
| JP | 4377965 | 12/2009 |
| KR | 2003062906 A | 3/2003 |
| WO | 2007114420 A1 | 10/2007 |
| WO | 2009/087895 | 7/2009 |
| WO | 2009/128115 | 10/2009 |
| WO | 2009/128207 | 10/2009 |
| WO | 2009123002 A1 | 10/2009 |

OTHER PUBLICATIONS

International Search Report mailed Feb. 15, 2011 for PCT/JP2010/073192.
Written opinion of the international searching authority mailed Feb. 15, 2011 for PCT/JP2010/073192.
Office action from JPO dispatched on Feb. 7, 2011 for Japanese Patent Application 2010-286237.
Extended European Search Report for application No. 10839483.4 date Oct. 12, 2015.

* cited by examiner

FIG. 3
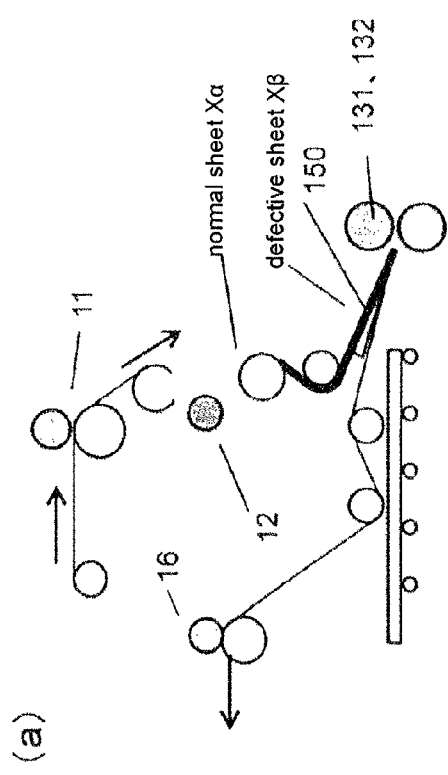
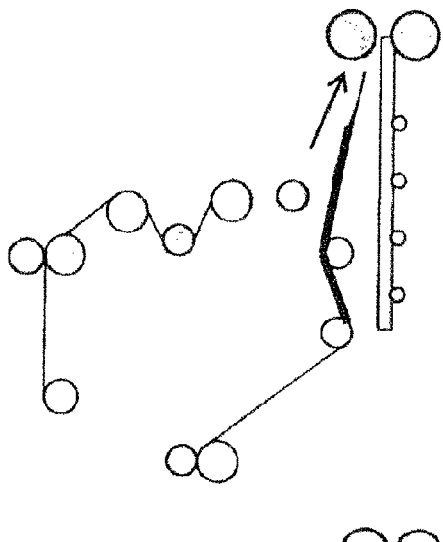
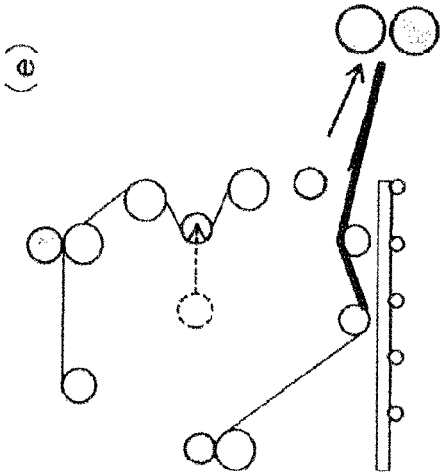
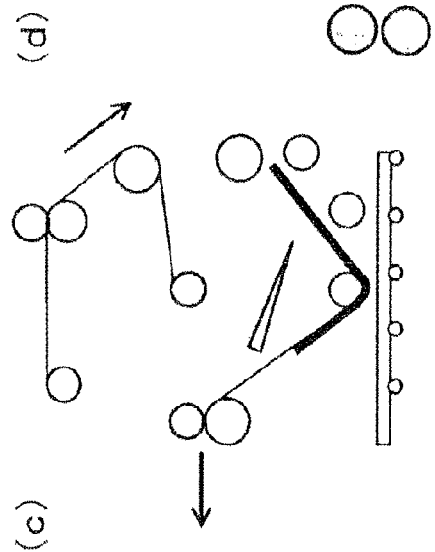

FIG. 11
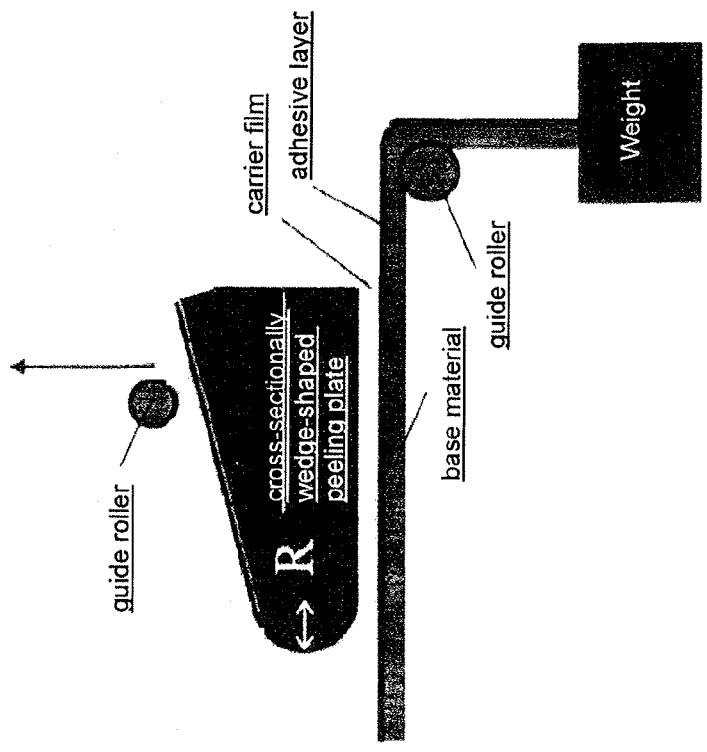
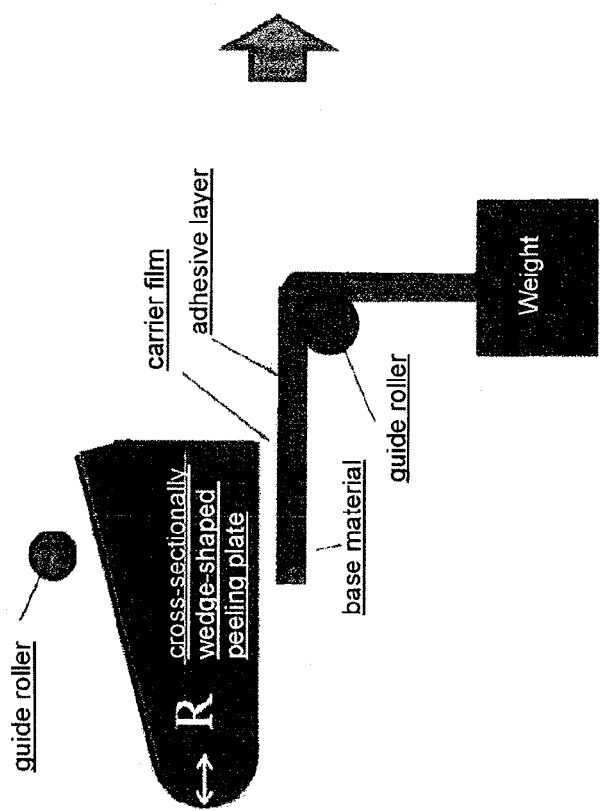

US 9,500,887 B2

METHOD AND APPARATUS FOR THE CONTINUOUS MANUFACTURE OF LIQUID CRYSTAL DISPLAY DEVICES

CROSS REFERENCE TO RELATED APPLICATION

This application claims the priority of Japanese Patent Application No. 2009-296110, filed on Dec. 25, 2009 in the JPO (Japan Patent Office). Further, this application is the National Phase application of International Application No. PCT/JP2010/073192 filed Dec. 22, 2010, which designates the United States and was published in Japanese.

TECHNICAL FIELD

The present invention relates to a method and apparatus for continuously manufacturing liquid crystal display panels, and more specifically to a method and apparatus for continuously manufacturing liquid crystal display panels by: preparing a strip-shaped film laminate which comprises a polarizing film having an adhesive layer formed thereon, and a carrier film releasably or peelably laminated to the adhesive layer; the polarizing film with the adhesive layer being divided into a plurality of polarizing film sheets on the carrier film, the polarizing film sheets comprising defect-free normal sheets and defect-containing defective sheets, wherein only the normal sheets are sequentially fed to a lamination position for lamination to respective ones of rectangular panels, and sequentially laminated on the rectangular panels while being aligned in position with the rectangular panels.

BACKGROUND ART

A method and apparatus for continuously manufacturing liquid crystal display panels by continuously laminating to a rectangular panel only a defect-free normal sheet of a polarizing film with an adhesive layer have already been disclosed in the following Patent Documents 1 and 2.

The Patent Document 1 discloses the following points. Refer to FIG. 14. Firstly, there is provided an optical film supply apparatus 100 for supplying a strip-shaped film laminate 2 which comprises a polarizing film Y having an adhesive layer formed thereon, which is adapted to be used for manufacturing liquid crystal display device, and a carrier film Z peelably laminated to the adhesive layer The strip-shaped film laminate 2 is provided in the form of a roll 101 and loaded on a feeding device 1. The apparatus 100 is provided with an information reading device 3 provided in a determination station A and operable to calculate a feed amount of the strip-shaped film laminate 2 and read a defect position in the polarizing film Y, the defect position being already determined by being detected and recorded by a preliminary inspection. The apparatus 100 further includes a cutting station B, wherein the polarizing film Y is cut into a plurality of polarizing film sheets X which may comprise defect-free normal sheets Xα and defect-containing defective sheets Xβ on the carrier film Z of the strip-shaped film laminate 2 being fed, based on the defect position information read from the polarizing film Y. There is a lamination station D provided as a final step, wherein those of the formed polarizing film sheets X determined as the normal sheets Xα are sequentially peeled from the carrier film Z, and continuously laminated to respective liquid crystal panels W fed in synchronization with feeding of the normal sheets Xα. Further, before reaching the final step, there is provided either one of a removal station C(1) or a removal station C(2), wherein one or more of the formed polarizing film sheets X determined as the defective sheets Xβ are sequentially peeled from the carrier film Z, and removed from the strip-shaped film laminate 2 to be passed via another path. In this manner, liquid crystal display devices are continuously fabricated.

The Patent Document 2 discloses the following matters. Refer to FIG. 15. Firstly, there is provided an optical film supply apparatus 100' for supplying a strip-shaped film laminate 2' which is provided in the form of a roll 101'. The strip-shaped film laminate 2' already includes a plurality of polarizing film sheets X which may comprise defect-free normal sheets Xα and defect-containing defective sheets Xβ which are preliminarily formed on a carrier film Z, based on position information about defects existing in a polarizing film Y having an adhesive layer and detected by a preliminary inspection. The roll 101' of the strip-shaped film laminate 2' is loaded in a feeding device 1', and the strip-shaped film laminate 2' having the polarizing film sheets X each being preliminarily defined by two longitudinally adjacent, transversely extending cut lines. Therefore, this optical film supply apparatus 100' has no need for the cutting station B. There is provided a determination station A' which has a determination device 3' for identifying the normal sheet Xα and the defective sheet Xβ in the polarizing film sheets X, as substitute for the information reading device 3 in FIG. 14. In the determination station A', it is determined whether each of the polarizing film sheets X is the normal sheet Xα or the defective sheet Xβ. In this respect, the respective strip-shaped film laminates 2, 2' disclosed in the Patent Document 1 and the Patent Document 2 are different from each other. The apparatus 100' has a lamination station D, either of a removal station C(1) or a removal station C(2) which are the same as those disclosed in the Patent Document 1. Specifically, in the lamination station D as a final step, a part of the polarizing film sheets X determined as the normal sheets Xα are sequentially peeled from the carrier film Z, and continuously laminated to respective liquid crystal panels W fed in synchronization with feeding of the normal sheets Xα. Further, before reaching the final step, in the removal station C(1) or the removal station C(2), one or more of the polarizing film sheets X determined as the defective sheets Xβ are sequentially peeled from the carrier film Z, and removed from the strip-shaped film laminate 2' via another path. In this manner, liquid crystal display devices are continuously fabricated.

Technical problems to be solved by the present invention are those inherent to the systems disclosed in the Patent Documents 1 and 2. From the standpoint of clarifying solutions to the technical problems, control of the entire continuous manufacture apparatus for manufacturing liquid crystal display devices disclosed in the Patent Document 1 will be overviewed based primarily on FIG. 14, and, in particular, description will be made in detail on technical problems inherent to the removal station C(1) or the removal station C(2) for peeling the defective sheet Xβ from the carrier film Z and removing the defective sheet Xβ from the strip-shaped film laminate 2 via another path.

In the followings, descriptions will be made on details of a specific operation of a defective sheet removal device 190 provided in the removal station C(1) or the removal station C(2) and adapted to be operated by a controller 300 for controlling the entire continuous manufacturing apparatus for manufacturing liquid crystal display devices disclosed in the Patent Document 1. When the polarizing film sheets X are formed by forming longitudinally adjacent cut lines in the cutting station B, the sheets may comprise the normal sheets Xα and the defective sheets Xβ and the defective sheet removal device 190 is operable to discriminate or sort out the defective sheets Xβ on the assumption that any polarizing film sheet having a length different from that of the normal sheet Xα is the defective sheet Xβ, or discriminate or sort out the defective sheet Xβ from the normal sheet Xα on the assumption that only a polarizing film sheet associated with defective-sheet identification information is the defective sheet Xβ, and peel and remove the defective sheet Xβ from the carrier film Z on which the polarizing film sheets X are peelably laminated.

The defective sheet removal device 190 in the removal station C(1) or the removal station C(2) illustrated in FIGS. 14 and 15 operates to discriminate or sort out the defective sheet Xβ under a control of the controller 300. Specifically, in the case of the removal station C(1), the defective sheet removal device 190 comprises a dummy film drive unit 191 having a function of attachingly peeling the defective sheet Xβ peelably laminated on the carrier film Z, and a moving unit 192 adapted to be activated when the defective sheet Xβ reaches a removal start point on a conveyance path for the strip-shaped film laminate 2 (strip-shaped film laminate conveyance path). The moving unit 192 is operable to move the strip-shaped film laminate conveyance path in such a manner as to allow the conveyance path to get closer to or away from a dummy film conveyance path 193 of the dummy film drive unit 191. In other words, the removal station C(1) is provided with two conveyance paths: the strip-shaped film laminate conveyance path; and the dummy film conveyance path 193, so that the defective sheet Xβ is reliably removed before it reaches the lamination position.

In the case of the removal station C(2), the defective sheet removal device 190 is configured to be cooperatively associated with a lamination device 13 comprising a pair of lamination rollers 131, 132 adapted to operate under a control of the controller 300, in the lamination station D. Specifically, the defective sheet removal device 190 comprises a dummy film drive unit 191 having a function of attachingly peeling the defective sheet Xβ, and a movable roller 192 adapted to form a dummy film conveyance path 193 of the dummy film drive unit 191. The defective sheet removal device 190 in the removal station C(2) is characterized in that, in the lamination station D, the movable roller 192 adapted to form the dummy film conveyance path 193 and disposed close to the pair of lamination rollers 131, 132 in the lamination device 13 is cooperatively associated with the lamination roller 131, 132 of the lamination device 13.

Specifically, the controller 300 is operable, when the defective sheet Xβ reaches an end point of the strip-shaped film laminate conveyance path (i.e., removal start point) in the lamination station D, to cause the pair of lamination rollers 121, 132 to become spaced apart from each other, while causing the movable roller 192 for forming the dummy film conveyance path 193 to be moved into a gap between the spaced-apart lamination rollers, whereby one 132 of the lamination rollers is replaced with the movable roller 192 to allow the movable roller 192 to be cooperatively associated with the other lamination roller 131.

At this timing, a cross-sectionally wedge-shaped peeling plate 150 is brought into contact with the strip-shaped film laminate 2 being taken up by a carrier film take-up drive device 17, at a position corresponding to a leading edge of the defective sheet Xβ comprised in the strip-shaped film laminate 2, so that the carrier film Z is taken up while being bent at an acute angle, which prevents the defective sheet Xβ from being taken up integrally with the carrier film Z. The defective sheet Xβ peeled in this manner is attached to the dummy film conveyance path 193 different from the strip-shaped film laminate conveyance path, by the movable roller 192 cooperatively associated with the other lamination roller 131, and removed.

In this case, the lamination station D additionally serves as the removal station C. This removal station C(2) is provided with three conveyance paths including a part of the strip-shaped film laminate conveyance path for feeding only the normal sheet Xα reliably peeled from the carrier film Z by using the cross-sectionally wedge-shaped peeling plate 150, the dummy film conveyance path for removing only the defective sheet Xβ, and a conveyance path for taking up the carrier film Z, and each of the polarizing film sheets comprising the normal sheet Xα and the defective sheet Xβ, and the carrier film Z, is fed or taken up via a corresponding one of the conveyance paths.

LIST OF PRIOR ART DOCUMENTS

Patent Documents

Patent Document 1: JP 4377964 B
Patent Document 2: JP 4377965 B
Patent Document 3: JP 2633726 B
Patent Document 4: JP 2005-271437 A

SUMMARY OF THE INVENTION

Problem to be Solved by the Invention

In order to realize continuous manufacture of liquid crystal display devices by continuously laminating normal ones Xα of the polarizing film sheets X to respective liquid crystal panel W, it is necessary to reliably remove defective ones Xβ of the polarizing film sheets X comprised in the strip-shaped film laminate 2 or 2', before each of the defective films Xβ reaches the final step.

If liquid crystal display devices are continuously fabricated under the condition that the defective films Xβ are imperfectly removed, production yield will be inevitably deteriorated. The only way to avoid sacrificing a per-hour production volume is to directly discard any defective product. On the other hand, in cases where it is attempted to subject a defective product to reworking for peeling a defective sheet Xβ therefrom to reuse a liquid crystal panel W so as to improve the yield, it is essential to provide a reworking process subsequent to the continuous manufacture process. Therefore, the continuous manufacture of liquid crystal display devices is required to provide a step of reliably removing defective ones Xβ of the polarizing film sheets X before each of the defective sheets Xβ reaches a final step, for example, the removal station C(1) or C(2) having the dummy film conveying path 193, disclosed in the Patent Documents 1 and 2.

Furthermore, in order to feed normal ones Xα of the polarizing film sheets X to the lamination position for lamination to a liquid crystal panel W so as to achieve accurate lamination thereof, it is necessary to peel each of the normal sheets Xα from the carrier film Z at an accurate timing, and laminating the peeled normal sheet Xα to a liquid crystal panel W fed to the lamination position in synchronization with feeding of the normal sheet, while positionally aligning the normal sheet with the liquid crystal panel W, in an accurate manner. It is impermissible to have a situation where, due to incomplete peeling of the normal sheet Xα, the normal sheet Xα is turned toward a carrier film take-up position 171 and taken up integrally with the carrier film Z.

The carrier film Z is a release film designed to protect the adhesive layer of the polarizing film Y during the process of continuously manufacturing liquid crystal display devices, and adapted to be taken up and removed when each of polarizing film sheets X is peeled from the strip-shaped film laminate 2 or 2' just before or during lamination to a liquid crystal panel. At a position where a leading edge of a normal one Xα of the polarizing film sheets X formed on the carrier film Z in the strip-shaped film laminate 2 or 2' reaches a leading edge of a liquid crystal panel W fed to the lamination position in synchronization with feeding of the normal sheet, only the carrier film Z is bent at an acute angle by the cross-sectionally wedge-shaped peeling plate 150 and taken up, so that the normal sheet Xα is reliably peeled from the carrier film Z. Then, the normal sheet Xα and the liquid crystal panel W are positionally aligned with each other, and a lamination operation for them will be started.

In view of apparatus simplification and reduction in load of works including disposal of used materials, it is obviously rational to integrate a dummy film to be taken up and removed together with the defective sheet Xβ attached thereto, and the carrier film to be taken up and removed, i.e., to integrate the dummy film conveyance path 193 with the carrier film conveyance path. More specifically, it is desirable to makes it possible to take up and discard the defective sheet Xβ while being attached to the carrier film Z, without peeling the defective sheet Xβ from the carrier film Z.

However, in order to continuously fabricate liquid crystal display devices, it is necessary that the strip-shaped film laminate 2 or 2' is fed without slack to allow only the normal sheet Xα of the polarizing film Y to be reliably peeled from the carrier film Z and fed to the lamination position, and, at the lamination position, a lamination operation is steadily started while positionally aligning the normal sheet Xα with a liquid crystal panel W. It is further necessary that the defective sheet Xβ is taken up integrally with the carrier film Z without being peeled therefrom. In order to guarantee the above operations, the entire apparatus has to be at least controlled such that devices and units of the apparatus are cooperatively associated with each other.

Reference may now be made to the following Patent Document 3. In this Patent Document, there is disclosed a system wherein a plurality of barcode labels are inspected as to their acceptability, and defective ones of the inspected barcode labels are collected by being left on a base paper, through a use of a changeover means which selectively leave the defective labels on the base paper. However, there is no teaching at all as to any specific technical means, such as a manner for peeling only normal one or more of the inspected barcode labels from the base paper and laminated to respective commercial products. It is to be understood that the technique of collecting a defective label while being attached to a mount cannot be applied to a removal mechanism for a defect-containing defective sheet Xβ, in a liquid crystal display device continuous manufacture method and apparatus configured to allow a lamination operation to be started while positionally aligning a defect-free normal sheet Xα of a polarizing film Y with a liquid crystal panel W.

Reference then may be made to the following Patent Document 4. In this Patent Document, there is disclosed that changeover means for selecting one of a peeling state and a non-peeling state depending on the quality of a film member attached to a conveyance sheet and laminatable to a glass substrate is provided in film conveyance means, and display devices are continuously fabricated using the changeover means. However, as to this changeover means, only a technique of selecting one of a knife-edge for the peeling state and a pair of peeling-prohibition rollers for the non-peeling state, and moving the knife-edge forwardly and backwardly with respect to a gap between the pair of peeling-prohibition rollers is disclosed, but other specific technical means is not disclosed therein at all.

Moreover, it is not disclosed whether the peeling state and the non-peeling state can be reliably selected depending on the quality of the film member by the changeover means. This Patent Document simply presents an abstract concept, because it does not disclose specific technical means, such as in what manner the system is controlled to allow a plurality of means making up the entire system to be cooperatively associated with each other. Thus, it cannot be applied to the liquid crystal display device continuous manufacture configured to allow a lamination operation to be started while positionally aligning a defect-free normal sheet Xα of a polarizing film Y with a liquid crystal panel W.

Means for Solving the Problem

The above technical problems can be solved by making it possible that, among a plurality of polarizing film sheets (X) which may comprise defect-free normal sheets (Xα) and defect-containing defective sheets (Xβ) each formed on a carrier film (Z) in the form of a strip-shaped film laminate (2, 2'), the normal sheet (Xα) is reliably peeled from the carrier film (Z) in association with feeding of the strip-shaped film laminate (2, 2'), and the defective sheet (Xβ) is reliably taken up while being left in the state attached to the carrier film (Z).

An embodiment of the present invention is described in the followings.

According to a first aspect of the present invention, there is provided a method for continuously manufacturing liquid crystal display devices, which is adapted to use a strip-shaped film laminate (2, 2') comprising a polarizing film (Y) having an adhesive layer formed thereon and being of a width corresponding to one of long and short sides of a rectangular panel, and a carrier film (Z) peelably laminated to the adhesive layer, a plurality of transversely extending, longitudinally spaced cut lines being formed in the polarizing film (Y) and the adhesive layer, a plurality of polarizing film sheets (X) being defined each between longitudinally adjacent two of the cut lines, each of the polarizing film sheets (X) being classified, based on a defect position detected by a preliminary inspection, into either a defect-free normal sheet (Xα) having a length corresponding to the other of the long and short sides of the rectangular panel, or a defect-containing defective sheet (Xβ); the method comprising the steps of: feeding the plurality of polarizing film sheets (X) in a state carried by the carrier film, with respect to a plurality of rectangular panels (W) being sequentially conveyed, sequentially toward a lamination position for lamination to each of the sequentially conveyed rectangular panels (W) in a manner that slacking in the strip-shaped film laminate (2, 2') is prevented or suppressed by cooperatively associating feeding means (1, 4, 9, 11, 16), take-up means (17) and tension adjustment means (12) with each other; using determination means (3, 3') provided for determining whether the polarizing film sheet (X) is a normal sheet (Xα) or a defective sheet (Xβ) and when one of the polarizing film sheets (X) is determined as the normal sheet (Xα) by determination means (3, 3'), operating sheet peeling means

(15) into an operative position wherein the sheet peeling means (15) acts on the strip-shaped film laminate (2, 2') which is being fed along a sheet feeding path, to have the normal sheet (Xα) peeled from the carrier film (Z), and fed to the lamination position so as to laminate the normal sheet (Xα) to one of the rectangular panels (W) fed to the lamination position in synchronization with the feeding of the normal sheet; and when one of the polarizing film sheets (X) is determined as the defective sheet (Xβ) by the determination means (3, 3'), operating sheet path changing means (14) into an operative position so as to change the sheet feeding path to bring the sheet peeling means (15) into a position wherein it does not act on the strip-shaped film laminate (2, 2') which is being fed along the sheet feeding path, to have the defective sheet (Xβ) fed while being held on the carrier film (Z) toward a carrier film take-up position (171) which is different from the lamination position, so that the polarizing film is taken up integrally with the carrier film (Z), by a predetermined length corresponding to the length of the defective sheet (Xβ) in the feeding direction.

The width of the strip-shaped film laminate (2, 2') is equal to the one of the long and short sides of the rectangular panel (W), and the length of the normal sheet (Xα) in the feeding direction is equal to the other of the long and short sides of the rectangular panel (W). On the other hand, the defective sheet (Xβ) in the feeding direction may have a length which is enough for covering one or more defects. Thus, the length of the defective sheet (Xβ) may not necessarily be set to a value equal to the other of the long and short sides of the rectangular panel (W).

In the method according to the first aspect of the present invention, the sheet peeling means (15) and the sheet path changing means (14) may be configured such that, when one of them is in the operative position, the other is out of the operative position. Further, the tension adjustment means may be configured to absorb slacking or tension occurring in the feeding of the strip-shaped film laminate (2, 2') when one of the sheet peeling means (15) and the sheet path changing means (14) is out of the operative position.

The method according to the first aspect of the present invention may further include the step of, when one of the polarizing film sheets (X) subsequent to the normal sheet (Xα) is determined as the defective sheet (Xβ) by the determination means (3, 3'), moving the sheet peeling means (15) out of the operative position, and operating the sheet path changing means (14) into the operative position, to have the defective sheet (Xβ) to be directed toward the carrier film take-up position (171), and taken up integrally with the carrier film (Z), by a predetermined length corresponding to the length of the defective sheet (Xβ) in the feeding direction.

The method according to the first aspect of the present invention may further include the step of, when one of the polarizing film sheets (X) subsequent to the defective sheet (Xβ) is determined as the normal sheet (Xα) by the determination means (3, 3'), moving the sheet path changing means (14) out of the operative position, and moving the sheet peeling means (15) into the operative position, to have the normal sheet (Xα) to be peeled from the carrier film (Z), and fed to the lamination position for lamination to the rectangular panel (W) so as to laminate the normal sheet (Xα) to one of the rectangular panels (W) fed to the lamination position for lamination to the rectangular panel (W), in synchronization with the feeding of the normal sheet.

The sheet peeling means (15) may be operated such that, when the sheet peeling means (15) is in the operative position wherein it acts on the strip-shaped film laminate (2, 2'), the sheet peeling means (15) is brought into contact with a reverse surface of the carrier film (Z) at a position corresponding to the leading edge of the normal sheet (Xα) of the polarizing film sheets (X) formed by the longitudinally adjacent two of the cut lines, at an acute angle with respect to the region of the reverse surface of the carrier film corresponding to the leading edge of the normal sheet (Xα). This makes it possible to bend the strip-shaped film laminate (2, 2'), thereby ensuring the normal sheet (Xα) to be peeled from the carrier film (Z) by being reversely turned, for example, by a cross-sectionally wedge-shaped peeling plate constituting the sheet peeling device, and fed to the lamination position for lamination to the rectangular panel (W), to laminate the normal sheet (Xα) to the rectangular panel.

The sheet path changing means (14) may be operated such that, when the sheet path changing means (14) is in the operative position, a member constituting the sheet path changing means such as a cross-sectionally arc-shaped surface of a turning member into contact with a reverse surface of the carrier film (Z) at a position corresponding to the defective sheet (Xβ) in the polarizing film sheets formed by the longitudinally adjacent two of the cut lines, to turn the strip-shaped film laminate (2, 2') along the cross-sectional arc-shaped surface, thereby having the defective sheet (Xβ) in the polarizing film sheet (X) to be directed toward the carrier film take-up position (171) while being integrally attached to the carrier film (Z), and fed by a predetermined length associated with the length of the defective sheet (Xβ) in the feeding direction.

In this case, a curvature radius R of the cross-sectionally arc-shaped surface to be brought into contact with the reverse surface of the carrier film (Z) to turn the carrier film (Z) along the cross-sectional arc may be determined, based on the relative relationship between the thickness of the polarizing film sheet (X), and the peeling force of the carrier film (Z) with respect to the adhesive layer on the polarizing film sheet (X), to a size to prevent the defective sheet (Xβ) from being peeled from the carrier film (Z).

According to the first aspect of the present invention, the sheet path changing means (14) may be operated such that, when the sheet path changing means (14) is in the operative position, the sheet path changing means (14) cooperates with support means having a concave surface corresponding to the cross-sectionally arc-shaped surface of the turning member, for example, at a position for turning the strip-shaped film laminate (2, 2') along the cross-sectionally arc-shaped surface of the turning member, so as to prevent the defective sheet (Xβ) from being peeled from the carrier film (Z).

According to a second aspect of the present invention, there is provided an apparatus for continuously manufacturing liquid crystal display devices which is adapted to use a strip-shaped film laminate (2, 2') comprising a polarizing film (Y) having an adhesive layer formed thereon and being of a width corresponding to one of long and short sides of a rectangular panel, and a carrier film (Z) peelably laminated to the adhesive layer, a plurality of transversely extending, longitudinally spaced cut lines being formed in the polarizing film (Y) and the adhesive layer, a plurality of polarizing film sheets (X) being defined each between longitudinally adjacent two of the cut lines, each of the polarizing film sheets (X) being classified, based on a defect position detected by a preliminary inspection, into either a defect-free normal sheet (Xα) having a length corresponding to the other of the long and short sides of the rectangular panel, or a defect-containing defective sheet (Xβ); the apparatus comprising a strip-shaped film laminate feeding device (100) for feeding the plurality of polarizing film sheets (X) in a state carried by the carrier film, with respect to a plurality of rectangular panels (W) being sequentially conveyed, sequentially toward a lamination position for lamination to each of the sequentially conveyed rectangular panels (W), the strip-shaped film laminate feeding device (100) at least including a feed out device (1, 4, 9, 11, 16), a take-up device (17) and a tension adjustment device (12) which are cooperated each other for feeding the laminate in a manner that slacking in the strip-shaped film laminate (2, 2') is prevented or suppressed; a determination device (3, 3') for determining whether each of the polarizing film sheets (X) is the normal sheet (Xα) or the defective sheet (Xβ), before the polarizing film sheet (X) reaches the lamination position; a sheet peeling device (15) operable, when one of the polarizing film sheets (X) is determined as the normal sheet (Xα) by the determination device (3, 3'), to have the normal sheet (Xα) peeled from the carrier film (Z), and fed to the lamination position; a lamination device (13) adapted to be driven in association with the strip-shaped film laminate feeding device (100) to laminate the normal sheet (Xα) to one of the rectangular panels (W) fed to the lamination position in synchronization with the feeding of the normal sheet; a sheet path changing device (14) adapted to be cooperatively associated with the strip-shaped film laminate feeding device (100), and operable, when one of the polarizing film sheets (X) is determined as the defective sheet (Xβ) by the determination device (3, 3'), to have the defective sheet (Xβ) to be directed toward a carrier film take-up position (171) different from the lamination position, and taken up integrally with the carrier film (Z), by a predetermined length corresponding to the length of the defective sheet (Xβ) in the feeding direction; and a controller (300) for operating the strip-shaped film laminate feeding device (100), the determination device (3, 3'), the sheet peeling device (15), the sheet path changing device (14) and the lamination device (13) in cooperative association with each other.

The width of the strip-shaped film laminate (2, 2') is equal to the one of the long and short sides of the rectangular panel (W), and the length of the normal sheet (Xα) in the feeding direction is equal to the other of the long and short sides of the rectangular panel (W). On the other hand, the defective sheet (Xβ) in the feeding direction may have a length which is adequate for covering one or more defects. Thus, the length of the defective sheet (Xβ) may not necessarily be set to a value equal to the other of the long and short sides of the rectangular panel (W).

In the apparatus according to the second aspect of the present invention, the sheet peeling device (15) and the sheet path changing device (14) may be configured such that, when one of them is cooperatively associated with the strip-shaped film laminate feeding device (100), the other is out of the cooperative association with the strip-shaped film laminate feeding device (100).

Further, the tension adjustment device (12) may be configured to absorb slacking or tensioning occurring in the feeding of the strip-shaped film laminate (2, 2') when one of the sheet peeling device (15) and the sheet path changing device (14) is out of the cooperative association with the strip-shaped film laminate feeding device (100).

In the apparatus according to the second aspect of the present invention, the sheet peeling device (15) comprises a cross-sectionally wedge-shaped peeling plate (150) adapted, when the sheet peeling device (15) is in the operative position or cooperatively associated with the strip-shaped film laminate feeding device (100), to be brought into contact with a reverse surface of the carrier film (Z) at a position corresponding to the leading edge of the normal sheet (Xα) in the polarizing film sheets (X) formed by the longitudinally adjacent two of the cut lines, to bend the strip-shaped film laminate (2, 2'), thereby having the normal sheet (Xα) peeled from the carrier film (Z) which is turned by the cross-sectionally wedge-shaped peeling plate (150) to be taken up, and fed to the lamination position for lamination to the rectangular panel (W), wherein the cross-sectionally wedge-shaped peeling plate has at least a width equal to that of the strip-shaped film laminate (2, 2').

In the apparatus according to the second aspect of the present invention, the sheet path changing device (14) may comprise a turning member adapted, when the sheet path changing device (14) is in the operative position, to be brought into contact with a reverse surface of the carrier film (Z) at a position corresponding to the defective sheet (Xβ) in the polarizing film sheets (X) formed by the longitudinally adjacent two of the cut lines, to turn the strip-shaped film laminate (2, 2') along a cross-sectional arc-shape, thereby having the defective sheet (Xβ) to be directed toward the carrier film take-up position (171) while being integrally attached to the carrier film (Z), and fed by a predetermined length associated with the length of the defective sheet (Xβ) in the feeding direction. In this case, the cross-sectionally arc-shaped surface of the turning member constituting the sheet path changing device (14) to be brought into contact with the reverse surface of the carrier film (Z) at a position corresponding to the defective sheet (Xβ) may have a curvature radius R which is determined such that the defective sheet (Xβ) is prevented from being peeled off the carrier film (Z), based on the relative relationship between the thickness of the polarizing film sheet (X), and the peeling force of the carrier film (Z) with respect to the adhesive layer on the polarizing film sheet (X).

In the apparatus according to the second aspect of the present invention, the sheet path changing device (14) may be configured such that, when the sheet path changing device (14) is in the operative position, it is cooperatively associated with a support portion (143, 144, 148, 1493) having a concave surface corresponding to the cross-sectionally arc-shaped surface of the turning member of the defective sheet path changing device (14) to be brought into contact with a region of the reverse surface of the carrier film Z corresponding to the defective sheet (Xβ), at a position for turning the strip-shaped film laminate (2, 2') along the cross-sectional arc-shape, so as to prevent the defective sheet (Xβ) from being peeled from the carrier film (Z).

BRIEF DESCRIPTION OF THE DRAWINGS

FIGS. 3(a) to 3(e) are schematic diagrams illustrating peeling/removal sub-steps in a peeling/removal station of the liquid crystal display continuous manufacture apparatus illustrated in FIG. 1.

FIG. 11 is schematic diagrams illustrating one example of a test apparatus for determining a curvature radius R of a turning member based on a relative relation between a thickness of a base member, and a peeling force of a carrier film with respect to an adhesive layer on the base member.

DESCRIPTION OF EMBODIMENTS (Outline of Liquid Crystal Display Continuous Manufacturing Apparatus which Includes a Cutting Station)

Description will now be made, with reference to FIGS. 1 to 3, FIGS. 4 to 6 and FIGS. 7 to 9, on preferred embodiments of the present invention as examples, each comprising a liquid crystal display continuous manufacturing apparatus using a strip-shaped film laminate 2 having a plurality of polarizing film sheets defined on a carrier film by longitudinally spaced, transversely extending cut lines which are formed on positions determined through a calculation based on a feed amount of the strip-shaped film laminate 2 derived by an encoder incorporated in a feeding device, and a defect position in a polarizing film detected and recorded through a preliminary inspection and read by an information reading device in a determination station. It is to be understood that the present invention may be implemented as a liquid crystal display device continuous manufacturing apparatus having no need for the cutting station B, by using a strip-shaped film laminate 2' which has preliminarily formed cut lines for defining a plurality of polarizing film sheets on a carrier film Z based on position information about a defect existing in a polarizing film with an adhesive layer, which is detected by a preliminary inspection. All of the apparatuss illustrated in FIGS. 1 to 3, FIGS. 4 to 6 and FIGS. 7 to 9 are of a type comprising the cutting station B. The configuration common to these apparatus is as follows.

Figure 1:
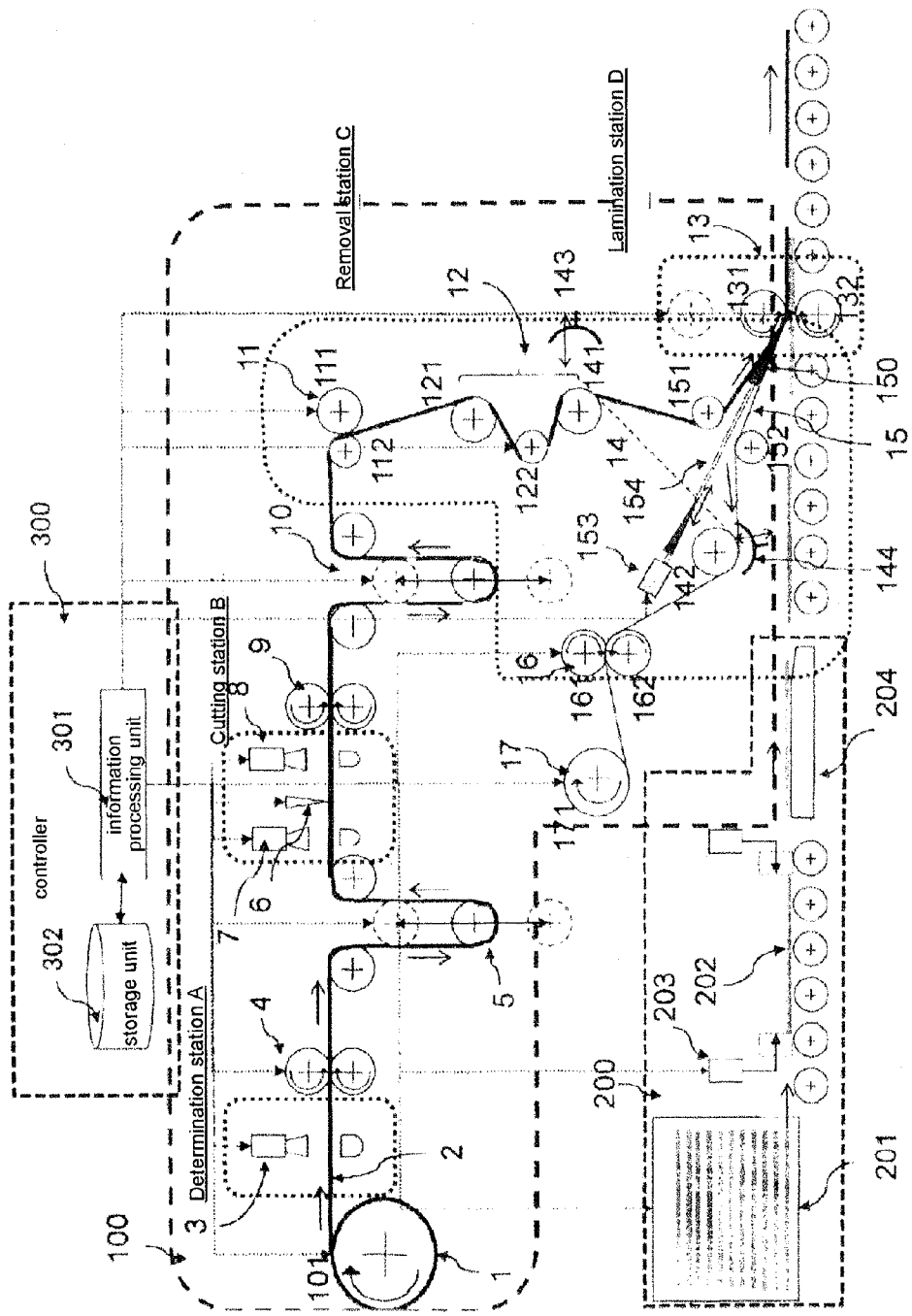
FIG. 1 is a conceptual diagram illustrating a liquid crystal display device continuous manufacture apparatus according to one embodiment of the present invention, which comprises a strip-shaped film laminate supply apparatus equipped with a roll of a strip-shaped film laminate and adapted to feed the strip-shaped film laminate from the roll, and a liquid crystal panel conveyance apparatus for conveying a liquid crystal panel to be laminated with a defect-free normal sheet of a polarizing film cut by forming widthwise cut lines in the strip-shaped film laminate.
Figure 4:
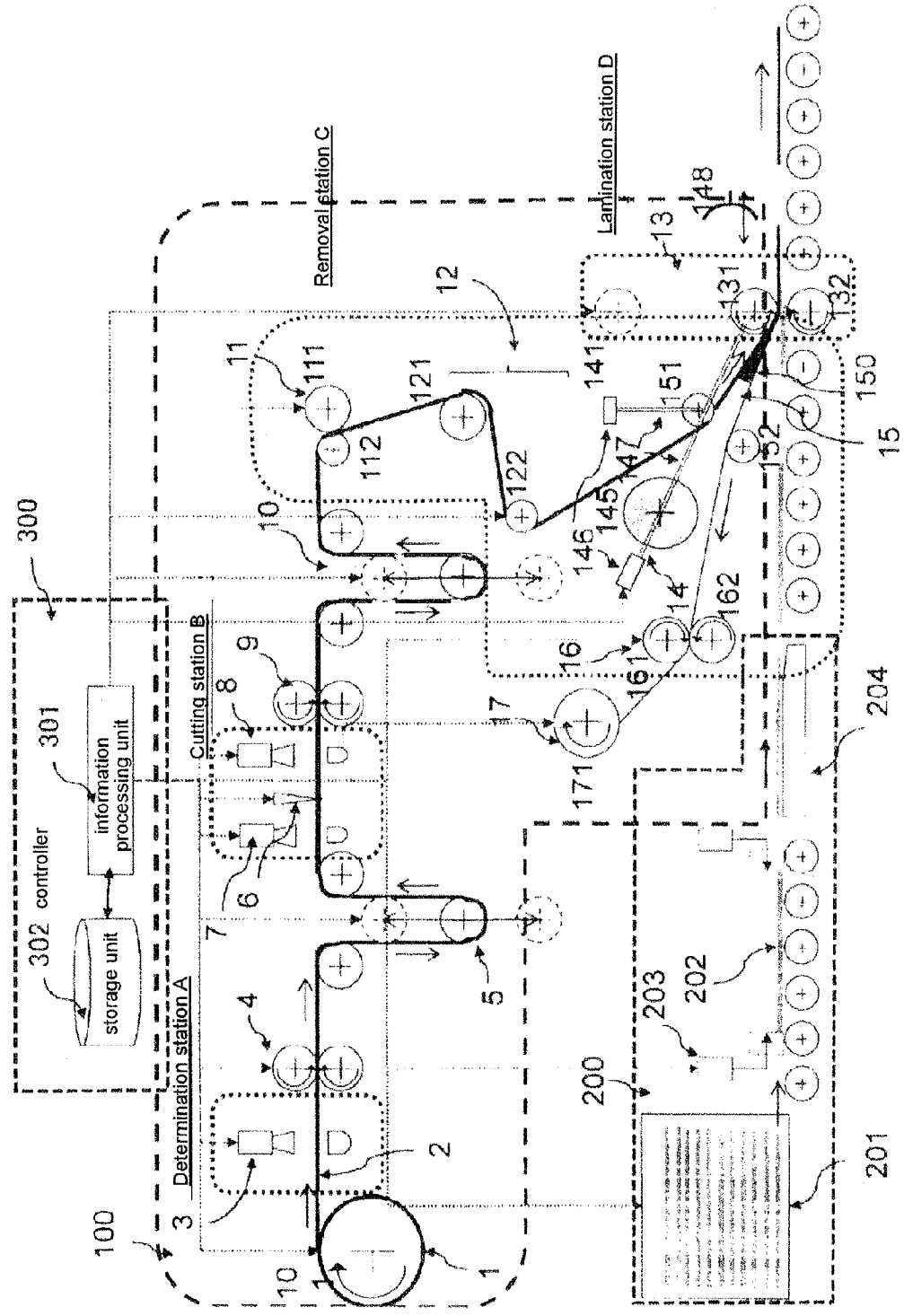
FIG. 4 is a conceptual diagram illustrating a liquid crystal display device continuous manufacture apparatus according to another embodiment of the present invention, which comprises a strip-shaped film laminate supply apparatus equipped with a roll of a strip-shaped film laminate and adapted to feed the strip-shaped film laminate from the roll, and a liquid crystal panel conveyance apparatus for conveying a liquid crystal panel to be laminated with a defect-free normal sheet of a polarizing film cut by forming widthwise cut lines in the strip-shaped film laminate.
Figure 7:
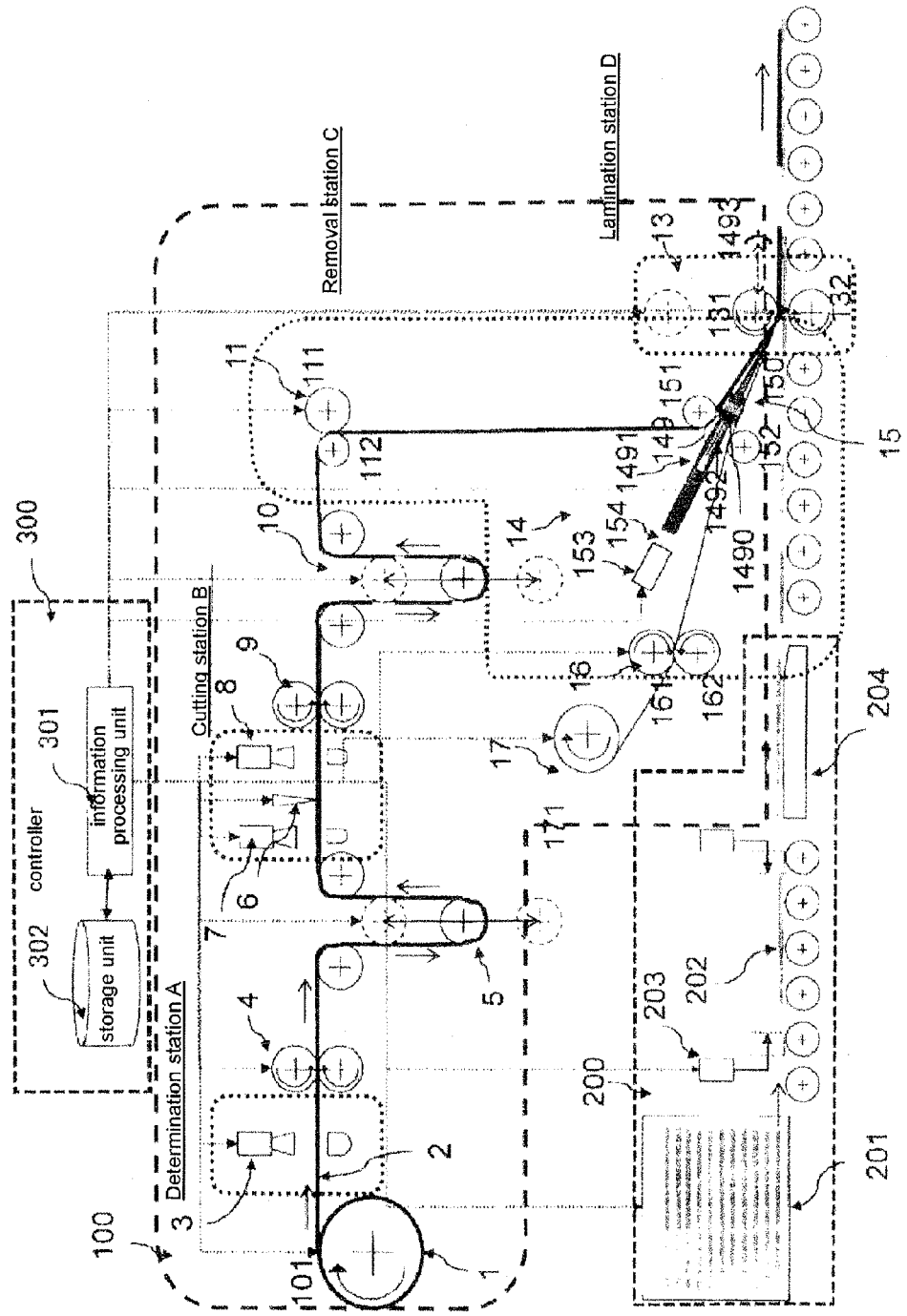
FIG. 7 is a conceptual diagram illustrating a liquid crystal display device continuous manufacture apparatus according to yet another embodiment of the present invention, which comprises a strip-shaped film laminate supply apparatus equipped with a roll of a strip-shaped film laminate and adapted to feed the strip-shaped film laminate from the roll, and a liquid crystal panel conveyance apparatus for conveying a liquid crystal panel to be laminated with a defect-free normal sheet of a polarizing film cut by forming widthwise cut lines in the strip-shaped film laminate.

Reference is to be made to FIGS. 1, 4 and 7. There is shown a strip-shaped film laminate supply apparatus 100 comprising a feeding device 1 in which a roll 101 of a strip-shaped film laminate 2 is rotatably loaded. The feeding device 1 may incorporate an encoder (not illustrated) for calculating a feeding amount. The strip-shaped film laminate supply apparatus 100 further comprises: a determination device 3 provided in a determination station A to read cutting position information based on a position of a defect existing in a polarizing film Y of the strip-shaped film laminate 2; two film feeding devices 4, 9 each including a feed roller for feeding the strip-shaped film laminate 2; a cutting station B provided with a cutting device 6 for making a cut in the strip-shaped film laminate 2 from a side opposite to the carrier film Z to a depth reaching a surface of a carrier film Z facing an adhesive layer to form a cut line, and two cutting position checkup devices 7, 8 for checking up a position of a cut line to be formed (cut line forming position) and a position of a formed cut line (formed cut line position); and two speed adjustment devices 5, 10 each including an accumulator roller (dancer roller) for allowing the strip-shaped film laminate to be fed at a constant speed.

There is provided a lamination station D of the strip-shaped film laminate supply apparatus 100 comprising a lamination device 13 which comprises a pair of lamination rollers 131, 132 for, among a plurality of polarizing film sheets X each formed between longitudinally adjacent two of cut lines in the strip-shaped film laminate 2, peeling a defect-free normal sheet Xα from the carrier film Z and laminating the normal sheet Xα to a rectangular panel W. The lamination device 13 is operated in cooperation with a liquid crystal panel supply apparatus 200 which comprises a liquid crystal panel magazine 201, a liquid crystal panel positioning guide 203, and a conveyance device 204.

Additionally, the strip-shaped film laminate supply apparatus 100 comprises a polarizing film sheet peeling/removal station C provided with a sheet peeling device 15 for peeling a defective-free normal one Xα of the polarizing film sheets X from the carrier film Z, a sheet path changing device 14 for feeding a defect-containing defective one Xβ of the polarizing film sheets X toward a carrier film take-up position 171 in a state wherein it is integrally attached to the carrier film Z, a tension adjustment device 12 for absorbing slacking or excessive tensioning which may occur when one of the sheet peeling device 15 and the sheet path changing device 14 is in its operative position, a carrier film take-up device 17 serving as a take-up device for the strip-shaped film laminate 2, and upstream and downstream film transporting or feeding devices 11, 16 adapted to be operatively associated with the carrier film take-up device 17 to control the peeling of the normal sheet Xα from the carrier film Z and the feeding of the defective sheet Xβ in an integral manner with the carrier film Z, wherein the upstream film feeding device 11 includes feed rollers 111 and 112 and the downstream film feeding device 16 includes feed rollers 161 and 162 for feeding or transporting the strip-shaped film laminate 2.

Figure 2:
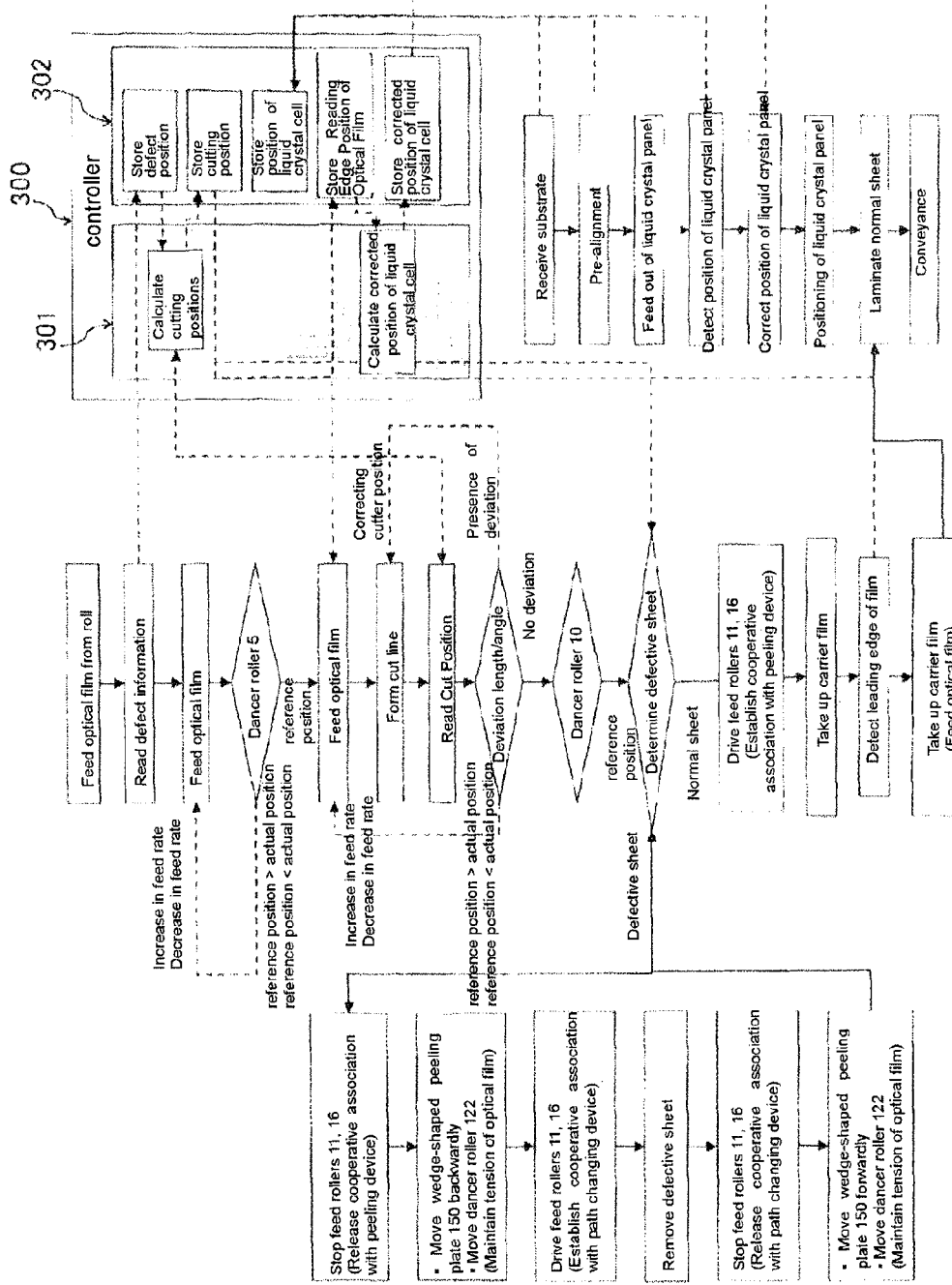
FIG. 2 is a flowchart illustrating a manufacture process or manufacture steps in the liquid crystal display device continuous manufacture apparatus illustrated in FIG. 1.
Figure 5:
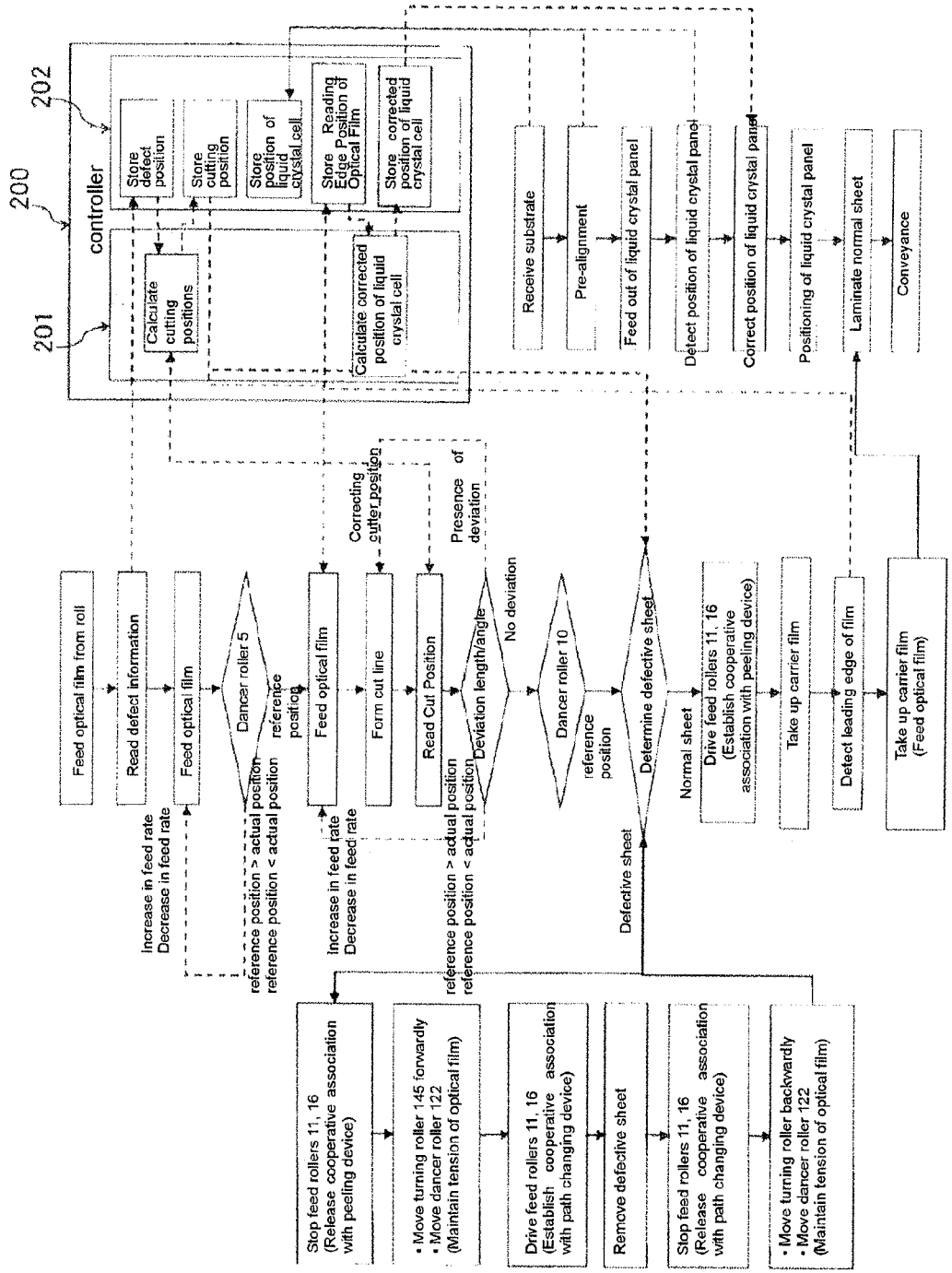
FIG. 5 is a flowchart illustrating a manufacture process or manufacture steps in the liquid crystal display device continuous manufacture apparatus illustrated in FIG. 4.
Figure 6:
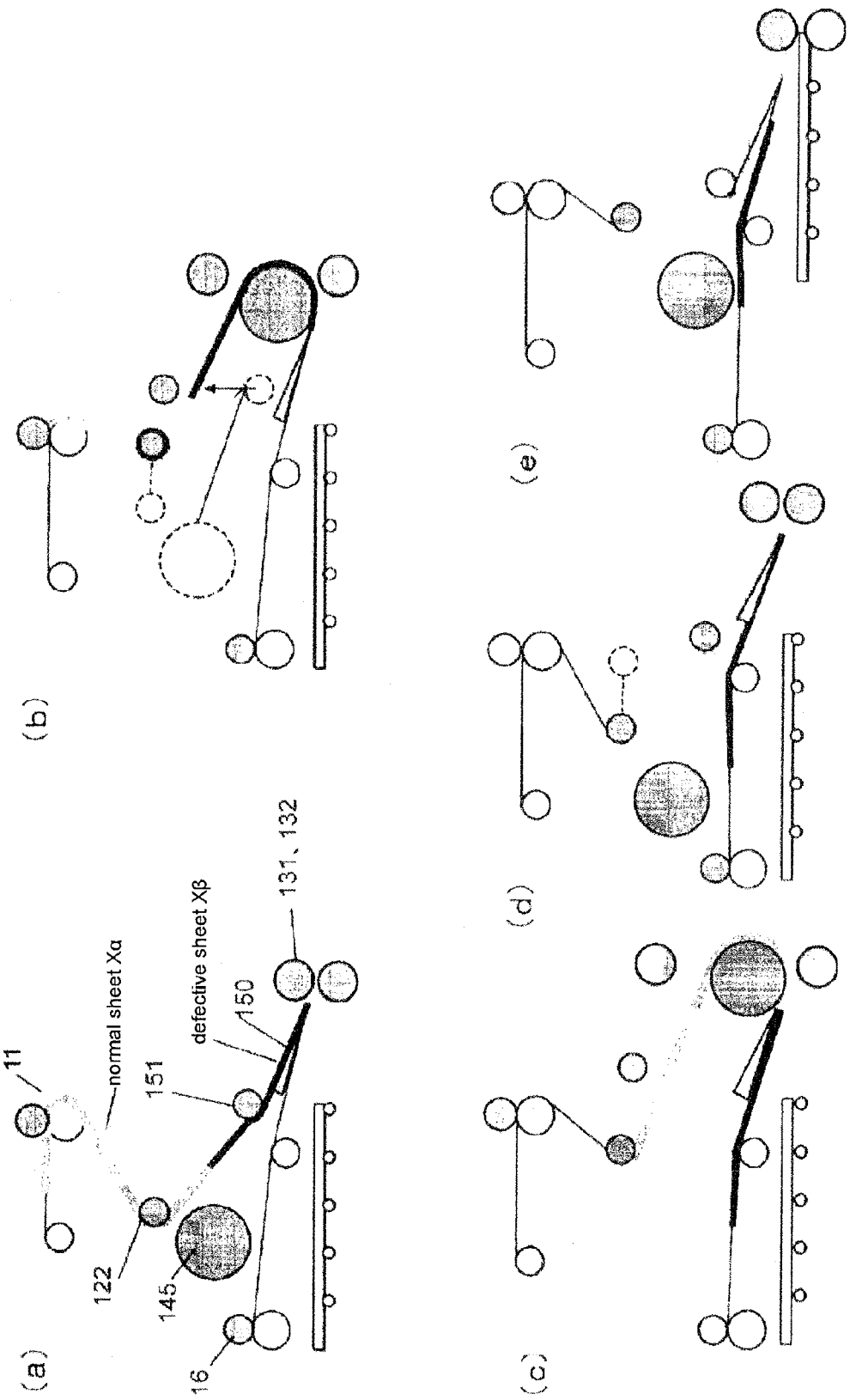
FIGS. 6(a) to 6(e) are schematic diagrams illustrating peeling/removal sub-steps in a peeling/removal station of the liquid crystal display device continuous manufacture apparatus illustrated in FIG. 4.

The embodiments of the present invention can be classified into three types, in terms of the configuration of the polarizing film sheet peeling/removal station C. In the first embodiment, the station C is designed using a fixed-type sheet path changing device 14, as illustrated in FIGS. 1 to 3. In the second embodiment, the station C is designed using a fixed-type sheet peeling device 15, as illustrated in FIGS. 4 to 6. In the third embodiment, the station C is designed using a sheet path changing device 14 and a sheet peeling device 15 which are configured to, based on a forward (or backward) movement of the sheet path changing device 14 and a backward (or forward) movement of the sheet peeling device 15, absorb slacking or excessive tensioning which may occur in the strip-shaped film laminate 2 when one of the sheet path changing device 14 and the sheet peeling device 15 is brought into cooperation with the strip-shaped film laminate supply apparatus 100.

FIGS. 3(a) to 3(e) are schematic diagrams illustrating the first embodiment. There is provided a freely-rotatable upstream turning roller 141 and a freely-rotatable downstream turning roller 142 each of which is in contact with a reverse surface of the strip-shaped film laminate 2 when either one of the sheet peeling device 15 or the sheet path changing device 14 is in the operative position to cooperatively associated with the strip-shaped film laminate supply apparatus 100. Refer also to FIGS. 1 and 2 together.

FIG. 3(a) is a schematic diagram illustrating a state when the polarizing film sheet X on the carrier film Z changes from the normal sheet Xα to the defective sheet Xβ. Specifically, firstly, based on an instruction of a controller 300, a cross-sectionally wedge-shaped peeling plate 150 constituting the sheet peeling device 15 is brought forwards through a space between the turning rollers 141, 142 into contact with the reverse surface of the carrier film Z at a position corresponding to the leading edge of the defective sheet Xβ. At this timing, the strip-shaped film laminate 2 is bent at an acute angle, by the tip end portion of the cross-sectionally wedge-shaped peeling plate 150, while maintaining a tension thereof by the tension adjustment device 12 located upstream of the upstream turning roller 141, preferably, in cooperation with two guide rollers 151, 152 freely rotatably supporting the strip-shaped film laminate 2 while being in contact with an obverse surface of the strip-shaped film laminate 2. This is the state in FIG. 3(a). Each of the turning rollers 141, 142 of the defective sheet path changing device 14 is equivalent to a turning member with a cross-sectionally arc-shaped surface.

Until just before this state, only the carrier film Z is taken up causing the normal sheet Xα to be peeled from the carrier film Z, by cooperatively associating the carrier film take-up device 17 with the upstream film feeding device 11 including the feed roller and the downstream film feeding device 16 including the feed rollers 161, 162. During this period, the turning rollers 141, 142 of the defective sheet path changing device 14 is released from a cooperative association with the strip-shaped film laminate supply apparatus 100. Further, during this period, the tension adjustment device 12 is in a forwardmost position.

FIG. 3(b) illustrates a state in which the sheet peeling device 15 is moved from the operative position wherein it is in the cooperative association with the strip-shaped film laminate supply apparatus 100, and the film feeding devices 11, 16 are stopped in operation, whereby the strip-shaped film laminate 2 is held by the feed rollers 111, 112; 161, 162 in a region between the feed rollers 111, 112; 161, 162. At start of this sub-step, based on an instruction of the controller 300, the cross-sectionally wedge-shaped peeling plate 150 of the sheet peeling device 15 in contact with the reverse surface of the carrier film Z at an acute angle and at a position corresponding to the leading edge of the defective sheet Xβ is moved backwardly. Simultaneously, the tension adjustment device 12 is also moved by a stroke necessary to absorb slacking caused by the backward movement of the cross-sectionally wedge-shaped peeling plate 150. Thus, the strip-shaped film laminate 2 is kept in an adequately tensioned state without slacking. When the backward movement of the cross-sectionally wedge-shaped peeling plate 150 is completed, the leading edge of the defective sheet Xβ is moved backwardly with respect to the feeding direction by the stroke of the tension adjustment device 12. In this state, the tension adjustment device 12 is moved to a backwardmost position.

FIG. 3(c) illustrates a state just after the sheet path changing device 14 is moved to the operative position wherein it is in cooperative association with the strip-shaped film laminate supply apparatus 100, to make it possible that the film feeding devices 11, 16 are activated based on an instruction of the controller 300, and thereby the carrier film Z is fed toward the carrier film take-up position 171 integrally with the defective sheet Xβ attached thereto, through the upstream and downstream turning rollers 141, 142 freely rotatably disposed at respective fixed positions while being in contact with the reverse surface of the strip-shaped film laminate 2. A feed amount of the carrier film Z in this sub-step is preferably set to a value equal to or less than a length of the defective sheet Xβ in the feeding direction.

FIG. 3(d) illustrates a state in which, under a condition that the sheet path changing device 14 is moved out of cooperative association with the strip-shaped film laminate supply apparatus 100 in response to a situation where the polarizing film sheet subsequent to the defective sheet Xβ is changed to the normal sheet Xα, the film feeding devices 11, 16 are deactivated, whereby the strip-shaped film laminate 2 is held by the feed rollers 111, 112; 161, 162 in a region between the feed rollers 111, 112; 161, 162. At start of this sub-step, based on an instruction of the controller 300, the cross-sectionally wedge-shaped peeling plate 150 of the sheet peeling device 15 is moved forwardly to pass through a space between the turning rollers 141, 142. The feeding operation of the strip-shaped film laminate 2 is locked by the feed rollers 111, 112; 161, 162, as described above. Thus, during the forward movement of the cross-sectionally wedge-shaped peeling plate 150, the tension adjustment device 12 is moved for a stroke appropriate to prevent any excessive tension which may otherwise additionally occur due to the forward movement of the cross-sectionally wedge-shaped peeling plate 150. Thus, the tension adjustment device 12 is moved to the forwardmost position. The cross-sectionally wedge-shaped peeling plate 150 is stopped when the tip portion thereof is brought into contact with the reverse surface of the carrier film Z at a position corresponding to the leading edge of the normal sheet Xα.

FIG. 3(e) illustrates a state just after the sheet peeling device 15 is in the operative position wherein it is in cooperative association with the strip-shaped film laminate supply apparatus 100, wherein, based on an instruction of a controller 300, the film feeding devices 11, 16 are activated to start the feeding of the strip-shaped film laminate 2. Preferably, the strip-shaped film laminate feeding device 2 is bent at an acute angle by the cross-sectionally wedge-shaped peeling plate 150 of the normal sheet peeling device 15 located at an apex of a triangle defined in cooperation with the guide rollers 151, 152 freely rotatably supporting the strip-shaped film laminate 2 while being in contact with the obverse surface of the strip-shaped film laminate 2, so that the normal sheet Xα is peeled from the carrier film Z, and only the carrier film Z is directed toward the carrier film take-up position 171 and taken up.

Referring to the carrier film take-up operation by the film feeding devices 11, 16, peeling of the normal sheet Xα is started at the position of the tip of the cross-sectionally wedge-shaped peeling plate 150 located at the apex of the triangle. The peeled leading edge of the normal sheet Xα is positionally aligned with the leading edge of a liquid crystal panel fed to the lamination position in synchronization with the feeding of the normal sheet Xα, and successively a lamination operation by the pair of lamination rollers 131, 132 is started.

Referring now to the second embodiment of the present invention, the peeling/removal station C is designed for using a fixed-type sheet peeling device 15, as illustrated in FIGS. 4 to 6, as mentioned above.

FIGS. 6(a) to 6(e) are schematic diagrams illustrating the second embodiment. The sheet peeling device 15 comprises a cross-sectionally wedge-shaped peeling plate 150 which is fixed at a position just before a pair of lamination rollers 131, 132 in the lamination station D, and adapted to come into contact with the reverse surface of the strip-shaped laminate when either one of the sheet peeling device 15 or the sheet path changing device 14 is in the operative position for cooperative association with the strip-shaped film laminate supply apparatus 100. Refer also to FIGS. 4 and 5 together.

FIG. 6(a) is a schematic diagram illustrating a state at a timing when the polarizing film sheet X on the carrier film Z is changed from the normal sheet Xα to the defective sheet Xβ. Specifically, based on an instruction of the controller 300, the cross-sectionally wedge-shaped peeling plate 150 of the sheet peeling device 15 is brought forwards through a space between an upstream guide roller 151 and a downstream guide roller 152 in contact with the reverse surface of the carrier film Z at an acute angle at a position corresponding to the leading edge of the defective sheet Xβ. In this state, the strip-shaped film laminate 2 is bent at an acute angle, by the tip portion of the cross-sectionally wedge-shaped peeling plate 150, while maintaining a tension thereof by the tension adjustment device 12 located upstream of the upstream guide roller 151, in cooperation with the guide rollers 151, 152 supporting the strip-shaped film laminate 2 while being in contact with the obverse surface of the strip-shaped film laminate 2. This is the state in FIG. 6(a).

Until just before this state, only the carrier film Z is taken up while causing the normal sheet Xα to be peeled from the carrier film Z, by cooperatively associating the carrier film take-up device 17 with the upstream film feeding device 11 including the feed rollers 111, 112 and the downstream film feeding device 16 including the feed rollers 161, 162. During this period, the sheet path changing device 14 is moved out of the cooperative association with the strip-shaped film laminate supply apparatus 100. Specifically, the sheet path changing device 14 illustrated in FIG. 4 comprises a turning roller 145 has a cross-sectionally arc-shaped surface and serves as a turning member. In this sub-step, the turning roller 145 is located at a backwardmost position of a guide rail 147. FIG. 6(a) illustrates the turning roller 145 in this state.

FIG. 6(b) illustrates a state in which the sheet peeling device 15 is moved out of cooperative association with the strip-shaped film laminate supply apparatus 100, and the film feeding devices 11, 16 are deactivated, whereby the strip-shaped film laminate 2 is held by the feed rollers 111, 112; 161, 162 in a region between the feed rollers 111, 112; 161, 162. At start of this sub-step, based on an instruction of the controller 300, the turning roller 145 of the sheet path changing device 14 is moved forwardly toward a region of the reverse surface of the carrier film Z corresponding to defective sheet Xβ.

Simultaneously, the upstream guide roller 151 and an upper one 131 of the pair of lamination rollers are moved away from the respective ones of the downstream guide roller 152 and a lower one 132 of the pair of lamination rollers, along respective guide rails thereof, to create therebetween a gap for allowing the turning roller 145 to pass therethrough. Further, the tension adjustment device 12 is moved for a stroke appropriate to absorb excessive tension which may be produced by the forward movement of the turning roller 145. Thus, the strip-shaped film laminate 2 is kept in an adequately tensioned state without slack.

When the forward movement of the turning roller 145 is completed, the defective sheet Xβ is moved forwardly with respect to the feeding direction by the stroke of the tension adjustment device 12. However, a region of the reverse surface of the carrier film Z including the leading edge of the defective sheet Xβ is separated from the tip of the cross-sectionally wedge-shaped peeling plate 150 and supported by a cross-sectionally arc-shaped surface of the turning roller 145. In this state, the tension adjustment device 12 is moved to a forwardmost position. When the turning roller 145 is moved to the forwardmost position, the region of the reverse surface of the carrier film Z including the leading edge of the defective sheet Xβ comes into contact with the cross-sectionally arc-shaped surface of the turning roller 145. This corresponds to the state in which a change in path of the polarizing film sheet X is completed, i.e., a state which allows the defective sheet Xβ to be taken up while being integrally attached to the carrier film Z, without going through the cross-sectionally wedge-shaped peeling plate 150 of the sheet peeling device 15.

FIG. 6(c) illustrates a state just after the sheet path changing device 14 is moved into the operative position for cooperative association with the strip-shaped film laminate supply apparatus 100. Based on an instruction of the controller 300, the film feeding devices 11, 16 are activated.

Thus, the carrier film Z is fed toward the carrier film take-up position 171 integrally with the defective sheet Xβ attached thereto, through the turning roller 145 of the defective sheet path changing device 14 located at the forwardmost position while being in contact with the reverse surface of the strip-shaped film laminate 2. A feed amount of the carrier film Z in this sub-step is preferably set to a value equal to or less than a length of the defective sheet Xβ in the feeding direction.

FIG. 6(d) illustrates a state in which, under a condition that the sheet path changing device 14 is moved out of cooperative association with the strip-shaped film laminate supply apparatus 100 in response to a situation where the polarizing film sheet subsequent to the defective sheet Xβ is changed to the normal sheet Xα, the film feeding devices 11, 16 are deactivated, whereby the strip-shaped film laminate 2 is held by the feed rollers 111, 112; 161, 162 in a region between the feed rollers 111, 112; 161, 162. At start of this sub-step, based on an instruction of the controller 300, the turning roller 145 of the sheet path changing device 14 located at the forwardmost position is moved backwardly along the driving guide rail 147 illustrated in FIG. 4, while passing through between the lamination rollers 131, 132 and between the guide rollers 151, 152. Then, the upper lamination roller 131 and the upstream guide roller 151 are moved along the respective guide rails thereof in a direction for narrowing or closing the gap with respect to respective ones of the lower lamination roller 132 and the downstream guide roller 152.

The strip-shaped film laminate 2 is locked by the feed rollers 111, 112; 161, 162, as described above. Thus, during the backward movement, the tension adjustment device 12 is moved for a stroke appropriate for preventing a slack from occurring in the strip-shaped film laminate 2 due to the backward movement of the turning roller 145. Thus, the tension adjustment device 12 is moved to the backwardmost position. As a result of the stroke, the strip-shaped film laminate 2 is stopped when or just before a region of the reverse surface of the carrier film Z corresponding to a leading edge of the normal sheet Xα of the strip-shaped film laminate 2 subsequent to the defective sheet Xβ is brought into contact with the tip of the fixed cross-sectionally wedge-shaped peeling plate 150, at an acute angle.

FIG. 6(e) illustrates a state just after the sheet peeling device 15 is operated in cooperative association with the strip-shaped film laminate supply apparatus 100, wherein, based on an instruction of the controller 300, the film feeding devices 11, 16 are activated to start the feeding of the strip-shaped film laminate 2. Preferably, the strip-shaped film laminate feeding device 2 is bent at an acute angle by the tip portion of the cross-sectionally wedge-shaped peeling plate 150 of the sheet peeling device 15 located at an apex of a triangle defined in cooperation with the guide rollers 151, 152 freely rotatably supporting the strip-shaped film laminate 2 while being in contact with the obverse surface of the strip-shaped film laminate 2, so that the normal sheet Xα is peeled from the carrier film Z, and only the carrier film Z is directed toward the carrier film take-up position 171 and taken up.

According to the carrier film take-up operation by the film feeding devices 11, 16, peeling of the normal sheet Xα is started at the position of the tip portion of the cross-sectionally wedge-shaped peeling plate 150 located at the apex of the triangle. The peeled leading edge of the normal sheet Xα is positionally aligned with the leading edge of a liquid crystal panel fed to the lamination position in synchronization with the feeding of the normal sheet Xα, directly followed by the start of a lamination operation using the pair of lamination rollers 131, 132.

In the third embodiment of the present invention, the peeling/removal station C is designed for using a sheet path changing device 14 and a sheet peeling device 15 which are configured to, based on a forward (or backward) movement of the sheet path changing device 14 and a backward (or forward) movement of the sheet peeling device 15, absorb slacking or excessive tension which may occur in the strip-shaped film laminate 2 when either one of the defective sheet path changing device 14 and the normal sheet peeling device 15 is brought into or out of cooperative association with the strip-shaped film laminate supply apparatus 100, as mentioned above.

Figure 10:
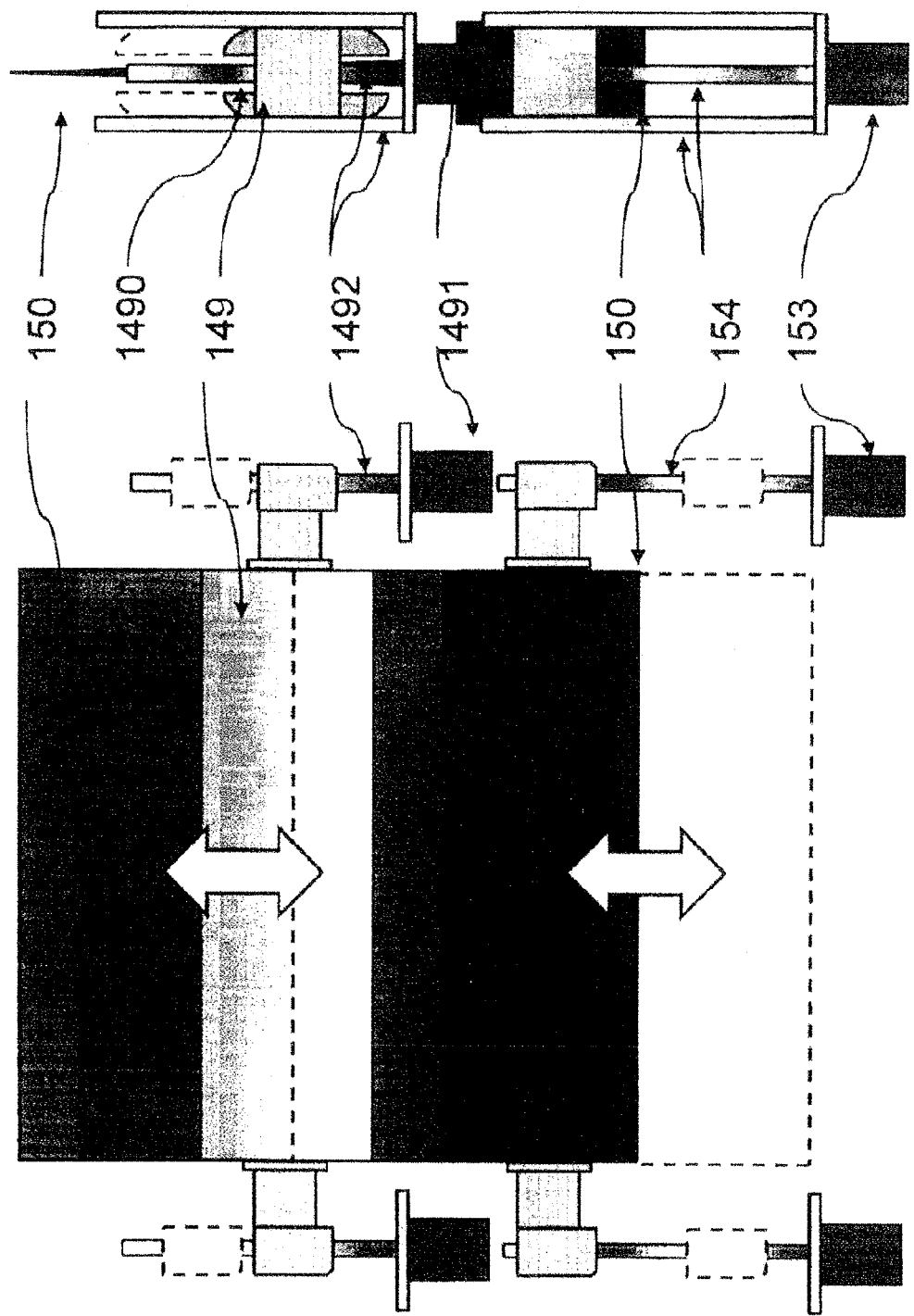
FIG. 10 is an enlarged top plan view and a side view illustrating a cross-sectionally wedge-shaped peeling plate and a tuning member having a cross-sectionally arc-shaped surface in the liquid crystal display device continuous manufacture apparatus illustrated in FIG. 7.

With reference to FIG. 10, a preferred embodiment of a turning member 149 with a cross-sectionally arc-shaped surface constituting the sheet path changing device 14, and a cross-sectionally wedge-shaped peeling plate 150 constituting the sheet peeling device 15, will be described below. As is clear from FIG. 7, the sheet peeling device 15 comprises a cross-sectionally wedge-shaped peeling plate 150 adapted to be moved forwardly and backwardly along a guide rail 154 by a driving unit 153. The sheet path changing device 14 which is to be cooperatively associated with the sheet peeling device 15 comprises a turning member 149 which is of at least a cross-sectionally oval, circular or semicircular configuration. Preferably, the turning member 149 is formed with a passage 1490 at a position corresponding to the movement path of the cross-sectionally wedge-shaped peeling plate 150. This allows the sheet path changing device 14 to be moved backwardly and forwardly along a guide rail 1492 by a driving unit 1491, correspondingly to respective ones of the forward movement and the backward movement of the normal sheet peeling device 15.

Figure 8:
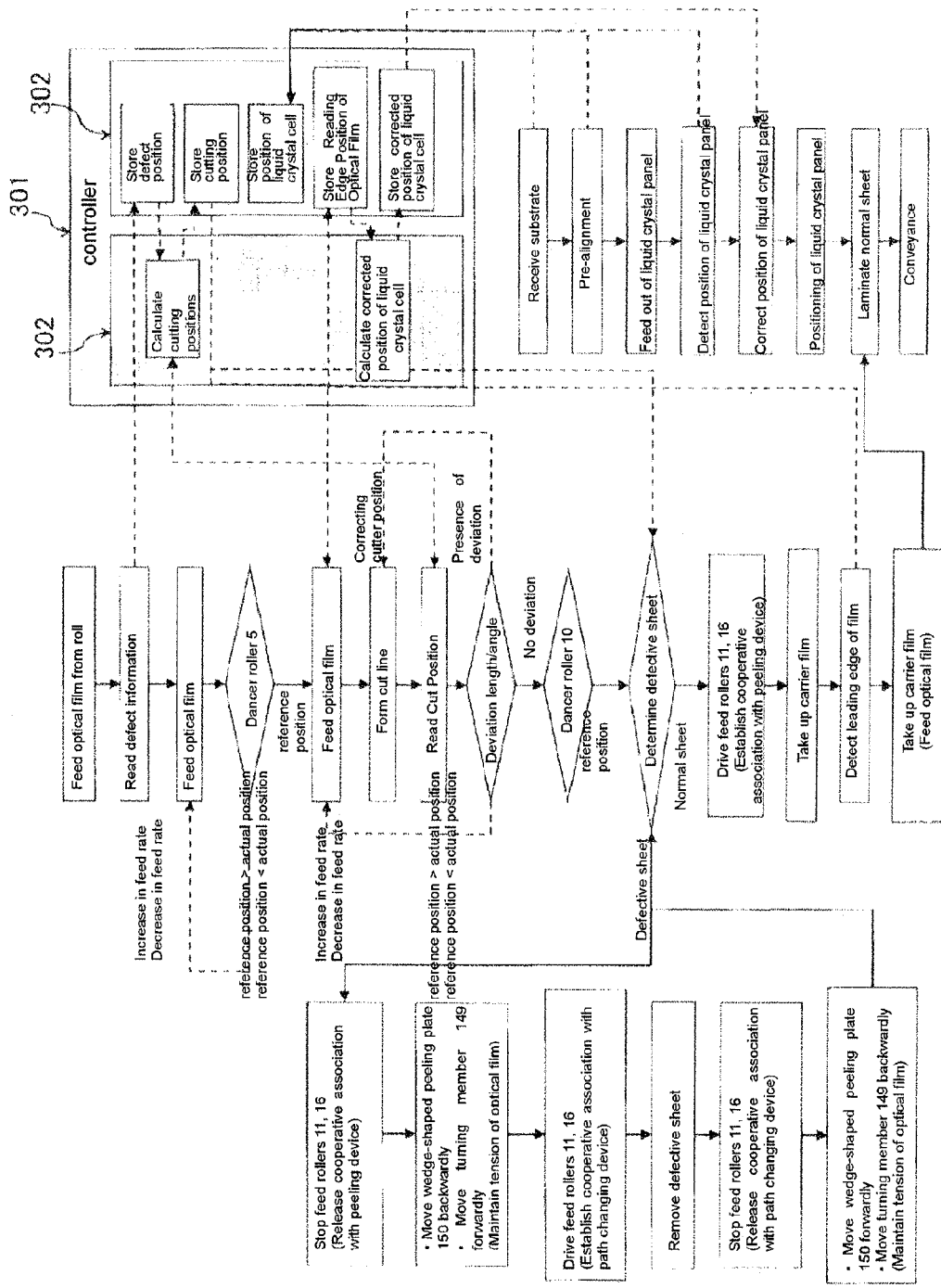
FIG. 8 is a flowchart illustrating a manufacture process or manufacture steps in the liquid crystal display device continuous manufacture apparatus illustrated in FIG. 7.

FIGS. 9(a) to 9(e) are schematic diagrams illustrating the third embodiment. As illustrated in FIG. 1, when either one of the sheet peeling device 15 or the sheet path changing device 14 is cooperatively associated with the strip-shaped film laminate supply apparatus 100, the cross-sectionally wedge-shaped peeling plate 150 of the sheet peeling device 15 adapted to be brought in contact with the reverse surface of the strip-shaped film laminate 2 is moved along the driving guide rail 154 between a forwardmost position for peeling the normal sheet Xα from the carrier film Z and a backwardmost position for taking up the carrier film Z integrally with the defective sheet Xβ attached thereto, by the driving unit 153. The forwardmost position is located just before the lamination rollers 131, 132 in the lamination station D. On the other hand, the turning member 149 of the defective sheet path changing device 14 is located at a backwardmost position when the cross-sectionally wedge-shaped peeling plate 150 is located at the forwardmost position, and located at a forwardmost position and cooperatively associated with the strip-shaped film laminate supply apparatus 100 when the cross-sectionally wedge-shaped peeling plate 150 is located at the backwardmost position. Detail thereof is as follows. Refer to FIGS. 8 and 9 in combination.

FIG. 9(a) is a schematic diagram illustrating a state at a timing when the polarizing film sheet X on the carrier film Z is changed from a normal sheet Xα to a defective sheet Xβ. Specifically, based on an instruction of the controller 300, the cross-sectionally wedge-shaped peeling plate 150 of the sheet peeling device 15 is brought forwards through a space between an upstream guide roller 151 and a downstream guide roller 152 in contact with the reverse surface of the carrier film Z at a position corresponding to the leading edge of the defective sheet Xβ. In this state, the upstream film feeding device 11 including the feed rollers 111, 112 and the downstream film feeding device 16 including the feed rollers 161, 162 are controlled to maintain a feed amount of the strip-shaped film laminate 2 constant so as to prevent slacking and excessive tension in the strip-shaped film laminate 2 from being produced. Thus, the strip-shaped film laminate 2 is bent at an acute angle by the tip portion of the cross-sectionally wedge-shaped peeling plate 150, in cooperation with the guide rollers 151, 152 freely rotatably supporting the strip-shaped film laminate 2 while being in contact with the obverse surface of the strip-shaped film laminate 2. This is the state shown in FIG. 9(a).

Until just before this state is achieved, only the carrier film Z is taken up and the normal sheets Xα are peeled from the carrier film Z. During this period, the sheet path changing device 14 is out of cooperative association with the strip-shaped film laminate supply apparatus 100 The turning member 149 is in a state in which the cross-sectionally wedge-shaped peeling plate 150 passes through the passage 1490 provided on the movement path of the cross-sectionally wedge-shaped peeling plate 150. The turning member 149 is located at the backwardmost position of the guide rail 1492. FIG. 9(a) illustrates the turning member 149, i.e., a turning member with a cross-sectionally arc-shaped surface, in this state.

FIG. 9(b) illustrates the state in which the sheet peeling device 15 is out of cooperative association with the strip-shaped film laminate supply apparatus 100, and the film feeding devices 11, 16 are deactivated, whereby the strip-shaped film laminate 2 is held by the feed rollers 111, 112; 161, 162 in a region between the feed rollers 111, 112; 161, 162. At this instance, based on an instruction of the controller 300, the cross-sectionally arc-shaped surface-including turning member 149 of the sheet path changing device 14 is started to move forwardly toward the region of the reverse surface of the carrier film Z corresponding to the defective sheet Xβ. Simultaneously, based on an instruction of the controller 300, the cross-sectionally wedge-shaped peeling plate 150 of the sheet peeling device 15 released from the cooperative association with the strip-shaped film laminate supply apparatus 100 is moved backwardly, correspondingly to the forward movement of the turning member 149. The forward movement of the cross-sectionally arc-shaped surface-including turning member 149 and the backward movement of the cross-sectionally wedge-shaped peeling plate 150 are performed such that the tension of the region of the strip-shaped film laminate 2 between the feed rollers 111, 112; 161, 162 is maintained in the same condition. The position where the forward movement of the cross-sectionally arc-shaped surface-including turning member 149 is completed corresponds to the forwardmost position of the cross-sectionally arc-shaped surface-including turning member 149. The position where the rearward movement of the cross-sectionally wedge-shaped peeling plate 150 is completed corresponds to the backwardmost position of the cross-sectionally wedge-shaped peeling plate 150.

When the forward movement of the cross-sectionally arc-shaped surface-including turning member 149 is completed, the region of the reverse surface of the carrier film Z corresponding to the leading edge of the defective sheet Xβ is separated from the tip portion of the cross-sectionally wedge-shaped peeling plate 150 and supported by the cross-sectionally arc-shaped surface of the cross-sectionally arc-shaped surface-including turning member 149. As to the positional relationship with respect to the lamination rollers 131, 132, the forwardmost position of the cross-sectionally arc-shaped surface-including turning member 149 is located farther away therefrom as compared with the forwardmost position of the cross-sectionally wedge-shaped peeling plate 150, so that the leading edge of the defective sheet Xβ coming into contact with the cross-sectionally arc-shaped surface of the cross-sectionally arc-shaped surface-including turning member 149 is turned while being attached to the carrier film Z. This corresponds to the state in which the change in path of the polarizing film sheet X is completed, i.e., the state which allows the defective sheet Xβ to be taken up while being integrally attached to the carrier film Z, without going through the cross-sectionally wedge-shaped peeling plate 150 of the normal sheet peeling device 15.

FIG. 9(c) illustrates the state just after the sheet path changing device 14 is operated into cooperative association with the strip-shaped film laminate supply apparatus 100. Based on an instruction of the controller 300, the film feeding devices 11, 16 are activated. Thus, the carrier film Z is fed toward the carrier film take-up position 171 with the defective sheet Xβ attached thereto, while slipping on the outer region of the cross-sectionally arc-shaped surface of the cross-sectionally arc-shaped surface-including turning member 149 of the sheet path changing device 14 located at the forwardmost position and being in contact with the reverse surface of the strip-shaped film laminate 2. The feed amount of the carrier film Z in this sub-step is preferably set to a value equal to or less than the length of the defective sheet Xβ in the feeding direction.

FIG. 9(d) illustrates the state in which, under a condition wherein the sheet path changing device 14 is out of cooperative association with the strip-shaped film laminate supply apparatus 100 in response to the situation where the polarizing film sheet subsequent to the defective sheet Xβ is changed to the normal sheet Xα, the film feeding devices 11, 16 are deactivated, whereby the strip-shaped film laminate 2 is fixed by the feed rollers 111, 112; 161, 162 in a region between the feed rollers 111, 112; 161, 162. At this instance, based on an instruction of the controller 300, the cross-sectionally wedge-shaped peeling plate 150 of the normal sheet peeling device 15 located at the backwardmost position is moved along the guide rail 154 forwardly toward the region of the reverse surface of the carrier film Z corresponding to the normal sheet Xα. Simultaneously, based on an instruction of the controller 300, the cross-sectionally arc-shaped surface-including turning member 149 of the sheet path changing device 14 moved out of cooperative association with the strip-shaped film laminate supply apparatus 100 is moved backwardly, correspondingly to the forward movement of the cross-sectionally wedge-shaped peeling plate 150. The forward movement of the cross-sectionally wedge-shaped peeling plate 150 and the backward movement of the cross-sectionally arc-shaped surface-including turning member 149 are performed such that the tension of the region of the strip-shaped film laminate 2 between the feed rollers 111, 112; 161, 162 to be maintained substantially unchanged. In this instance, the cross-sectionally wedge-shaped peeling plate 150 reaches the position where it is in contact with the region of the reverse surface of the carrier film Z corresponding to the leading edge of the normal sheet Xα, and stopped at this position. The position where the forward movement of the cross-sectionally wedge-shaped peeling plate 150 is completed corresponds to the forwardmost position of the cross-sectionally wedge-shaped peeling plate 150. The position where the rearward movement of the cross-sectionally arc-shaped surface-including turning member 149 is completed corresponds to the backwardmost position of the cross-sectionally arc-shaped surface-including turning member 149.

Figure 9:
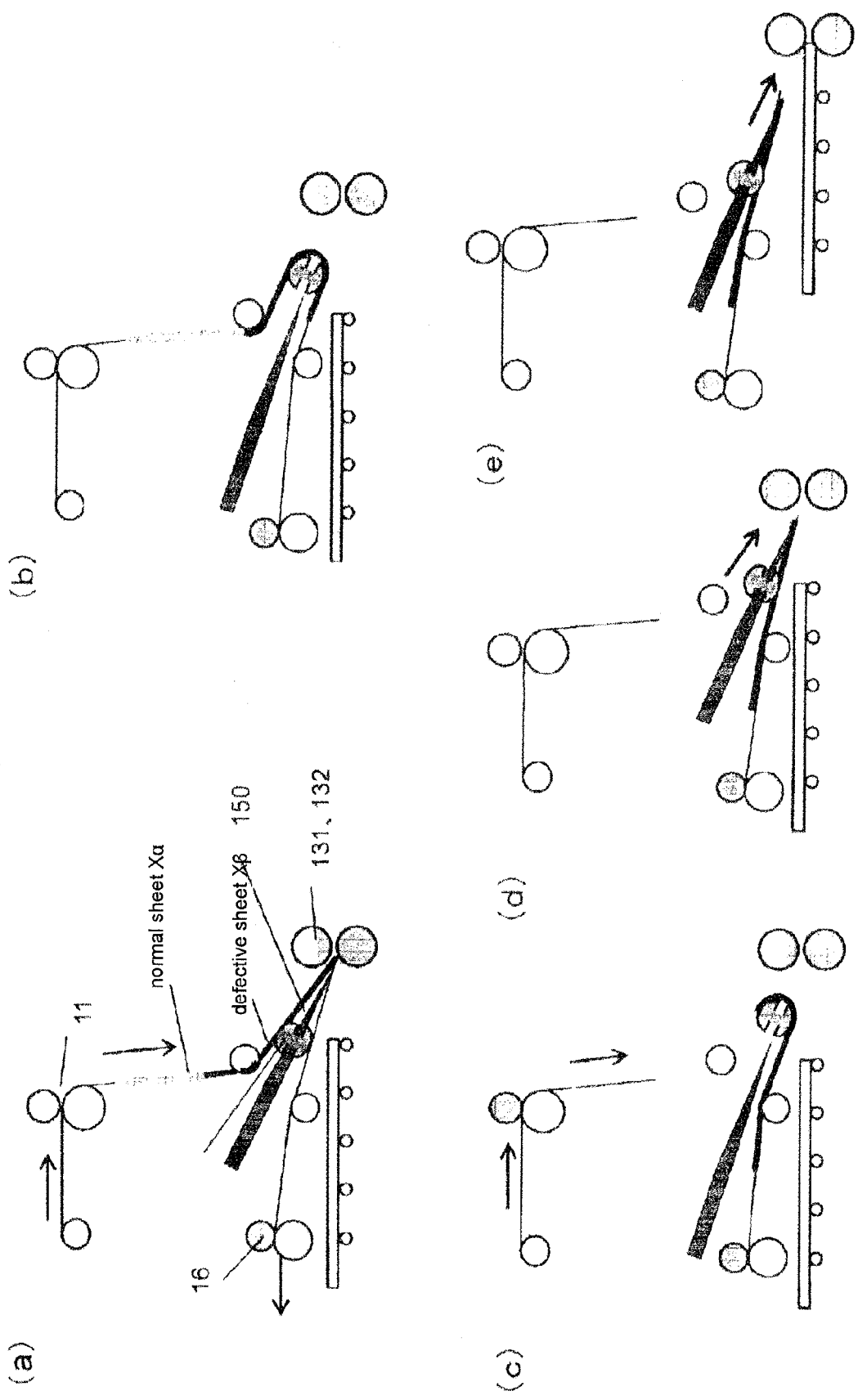
FIGS. 9(a) to 9(e) are schematic diagrams illustrating peeling/removal sub-steps in a peeling/removal station of the liquid crystal display device continuous manufacture apparatus illustrated in FIG. 7.

FIG. 9(*e*) illustrates the state just after the sheet peeling device 15 is operated into cooperative association with the strip-shaped film laminate supply apparatus 100, wherein, based on an instruction of the controller 300, the film feeding devices 11, 16 are activated to start the feeding of the strip-shaped film laminate 2. Preferably, the strip-shaped film laminate feeding device 2 is bent at an acute angle by the tip portion of the cross-sectionally wedge-shaped peeling plate 150 of the normal sheet peeling device 15 located at an apex of a triangle defined by the cross-sectionally wedge-shaped peeling plate 150 of the sheet peeling device 15 together with the rotatably supported guide rollers 151, 152 supporting the strip-shaped film laminate 2 by being in contact with the obverse surface of the strip-shaped film laminate 2, so that the normal sheet Xα is peeled from the carrier film Z, and only the carrier film Z is directed toward the carrier film take-up position 171 to be taken up.

Through the carrier film take-up operation by the film feeding devices 11, 16, the peeling operation of the normal sheet Xα is started at the position of the tip portion of the cross-sectionally wedge-shaped peeling plate 150 located at the apex of the triangle. The peeled leading edge of the normal sheet Xα is positionally aligned with the leading edge of a liquid crystal panel fed to the lamination position in synchronization with the feeding of the normal sheet Xα, directly followed by the start of the lamination operation using the pair of lamination rollers 131, 132.

(Curvature Radius R of Cross-sectionally Arc-shaped Surface of Turning Member)

The strip-shaped film laminate 2 comprises at least a polarizing film Y, a carrier film Z, and an adhesive layer N which is attached to the polarizing film Y and functions to have the two films peelably laminated.

Among the plurality of polarizing film sheets X which are formed on the carrier film Z and may include normal sheets Xα and defective sheets Xβ, the defective sheet Xβ having the adhesive layer and peelably laminated on the carrier film Z has to be transported for taking-up in the state attached to the carrier film at the position corresponding to the region of the reverse surface which is to be brought into contact with the turning member having a cross-sectionally arc-shaped surface, specifically, either the cross-sectionally arc-shaped surface of one of the turning rollers 141, 142 illustrated in FIG. 1, the turning roller 145 illustrated in FIG. 2, or the turning member 149 illustrated in FIG. 3. Whether or not the polarizing film sheet X is peeled depends on the relative relationship between respective ones of the curvature radius R of the cross-sectionally arc-shaped surface of the turning member, the thickness of the polarizing film sheet X without the adhesive layer N, and the peeling force of the carrier film Z with respect to the adhesive layer N. In the followings, the polarizing film sheet X without the adhesive layer N will be referred to as a "base member".

The curvature radius R of the cross-sectionally arc-shaped surface of the turning member is determined based on the relative relationship between the thickness of the base member and the peeling force of the carrier film Z with respect to the adhesive layer N. One example of the relative relationship will be described below. FIG. 11 illustrates a tested system used.

As illustrated in the left diagram in FIG. 11, there is provided a strip-shaped film laminate comprising an elongated web of carrier film and a base member having a length shorter than the carrier film and releasably laminated to the carrier film through an adhesive layer formed on the base member, the strip-shaped film laminate being then arranged to pass around and be brought into contact at its exposed surface with a turning member having a cross-sectionally arc-shaped surface of a curvature radius R on a distal end thereof to provide a peeling point, in such a manner that the border of the portion of the carrier film having the base member attached thereto through the adhesive layer and the portion of the carrier film having no base member thereon is located upstream of the tip portion of the cross-sectionally arc-shaped surface of the turning member, the portion of the carrier film having no base member being then turned pulled upwardly at a constant rate apart from the contact with one of the opposite surfaces of the turning member by being passed around a guide roller.

Thus, as illustrated in the right diagram in FIG. 11, when the border between the portion of the carrier film having the base member laminated thereon through the adhesive layer formed thereon and the portion of the carrier film having no Base member reaches the tip portion of the cross-sectionally arc-shaped surface of the cross-sectionally arc-shaped turning member, the base member may or may not be peeled from the carrier film depending on the relationship between the resistive force due to the bending stiffness of the base member, and the peeling force of the carrier film which is determined by the adhesive power of the adhesive layer on the base member, as well as the curvature radius R. Tests have been conducted with variously changed curvature radius R of the cross-sectionally arc-shaped surface of the cross-sectionally arc-shaped surface-including turning member in order to determine whether or not the base member is peeled at the peeling point.

Figure 12:
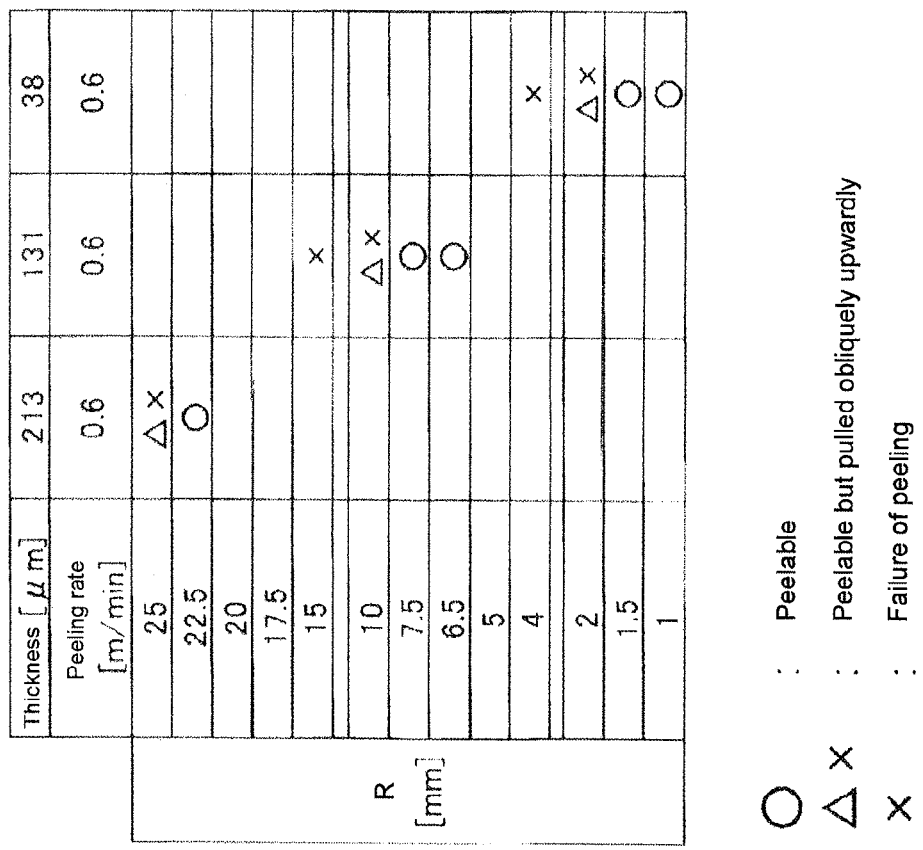
FIG. 12 is a table illustrating a result of a test using three types of base members each having an adhesive layer, as samples, wherein each of the base members has a width of 50 mm and a different thickness.

Reference is now made to FIG. 12. The state of the base member being peeled was evaluated by classifying the tested samples into a perfect peeling, an incomplete peeling in which the base member with the adhesive layer is finally peeled it was pulled obliquely upwardly by being drawn by the carrier film, and a failure in peeling. FIG. 12 illustrates the test results. In the test, as the base members, three types of samples each having a width of 50 mm was prepared using two polarizing films VEGQ 1723 NTB (thickness: 213 μm) and CIG 1484 CVAG 350 (thickness: 131 μm) produced by Nitto Denko Corporation, and a polarizing film PET T-390 (thickness: 38 μm) produced by Mitsubishi Plastics, Inc., considering differences in stiffness (thickness) among these films. In FIG. 12, the "thickness" designates the value of the polarizing film without an adhesive layer. The bending stiffness is derived from the elastic modulus of the base member. Generally, films for use in liquid crystal display devices are made of a synthetic resin, and there is not a significant difference in elastic modulus between the films. Therefore, the level of bending stiffness substantially depends on the thickness of the base member.

In the test, in order to apply a tension, a weight of 1 kg/50 mm was attached to the lower end of the strip-shaped film laminate as illustrated in FIG. 11. A 180-degree peeling force of the carrier film with respect to the adhesive layer on the base member was in the range of 0.05 to 0.15 [N/50 mm]. In the test, the transportation speed was determined to 0.6 [m/min]. The values of R [mm] under which peeling was failed were obtained with respect to the thicknesses of the base members in the range of 1 to 25 mm.

Figure 13:
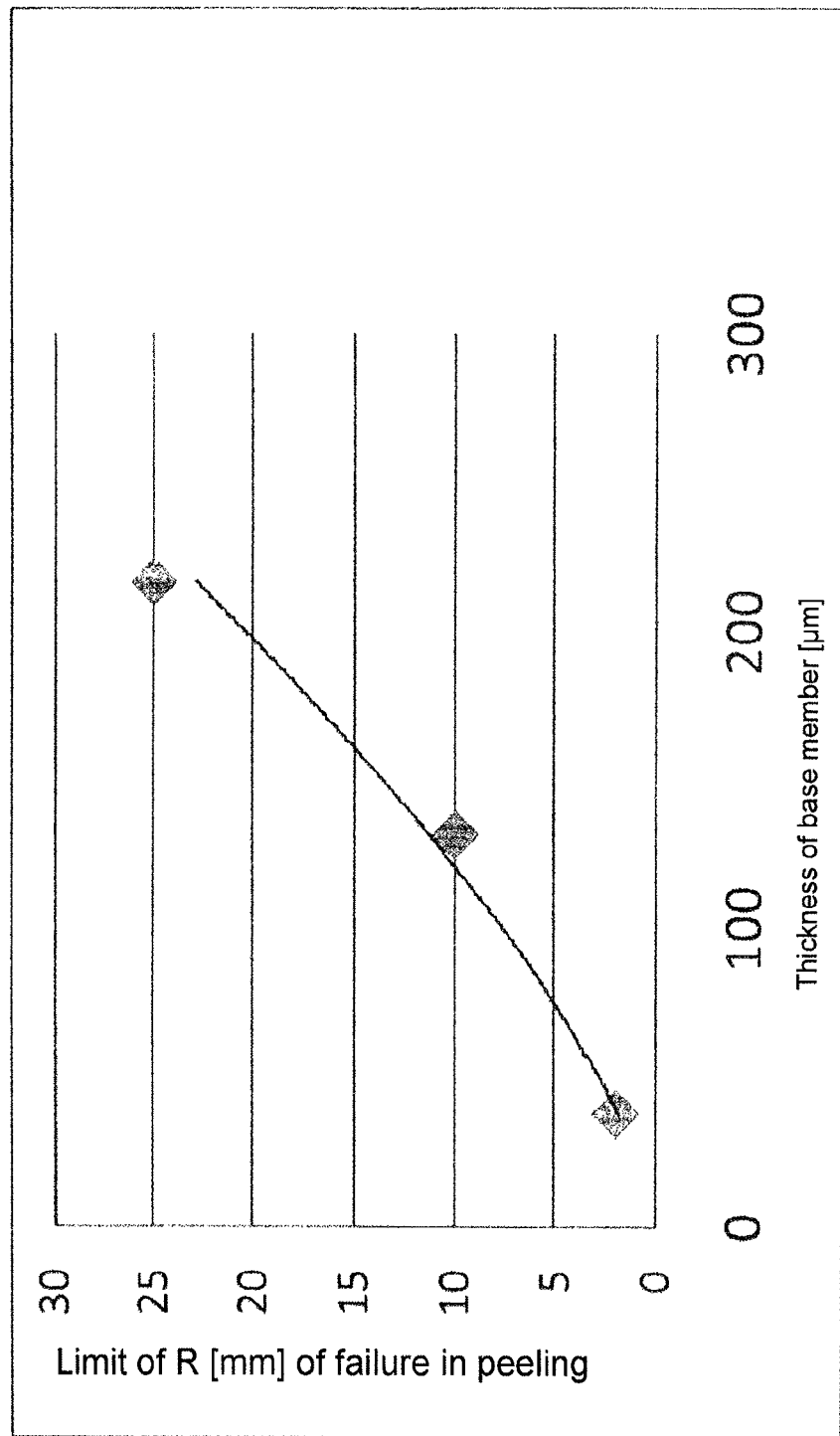
FIG. 13 is a graph illustrating a relationship between the thickness of the base member with the adhesive layer, and the limit of R incapable of causing peeling.
Figure 14:
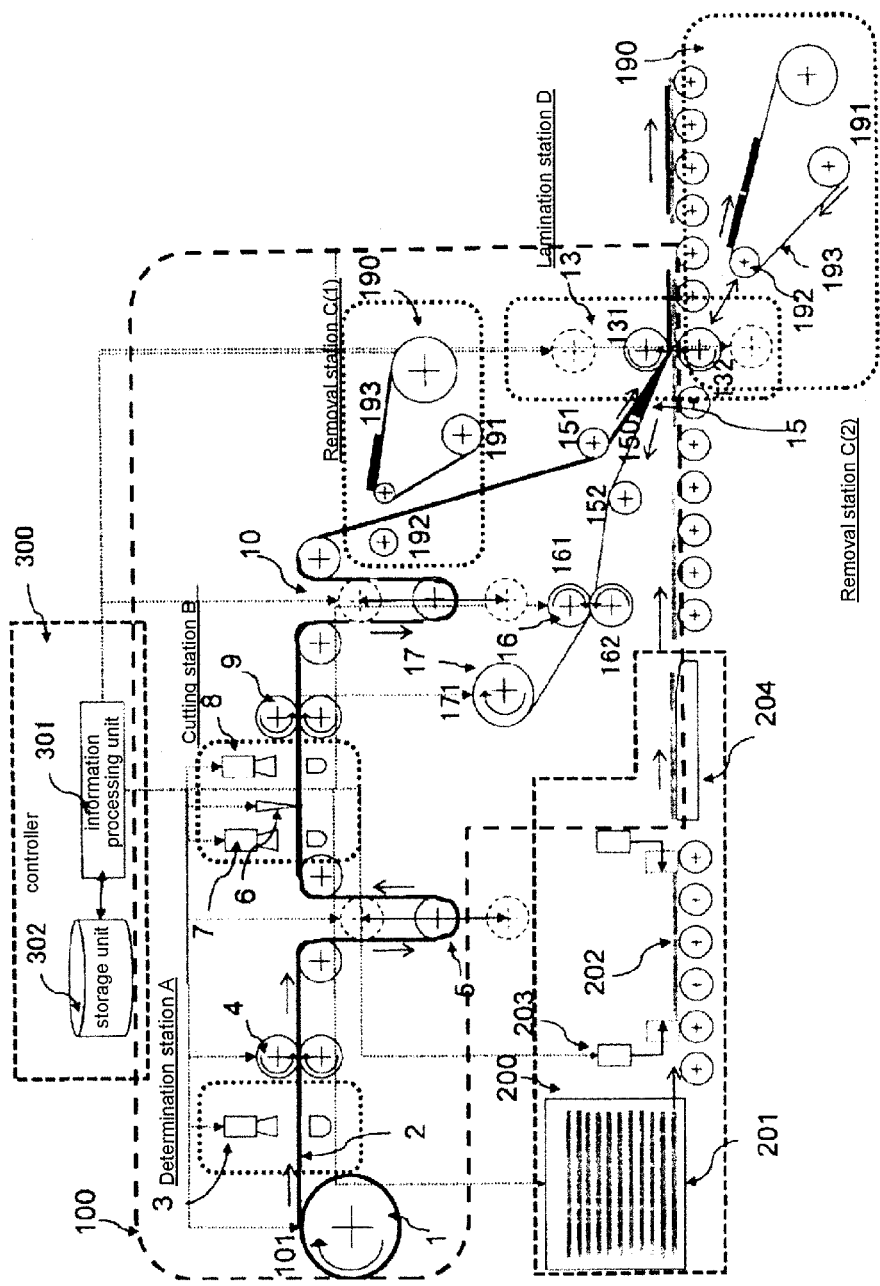
FIG. 14 is a conceptual diagram illustrating a liquid crystal display device continuous manufacture apparatus disclosed in the Patent Document 1, which comprises a cutting station B for forming a plurality of polarizing film sheets comprising a defect-free normal sheet and a defect-containing defective sheet, based on defect position information read from a polarizing film of a strip-shaped film laminate by a determination device in a determination station A.
Figure 15:
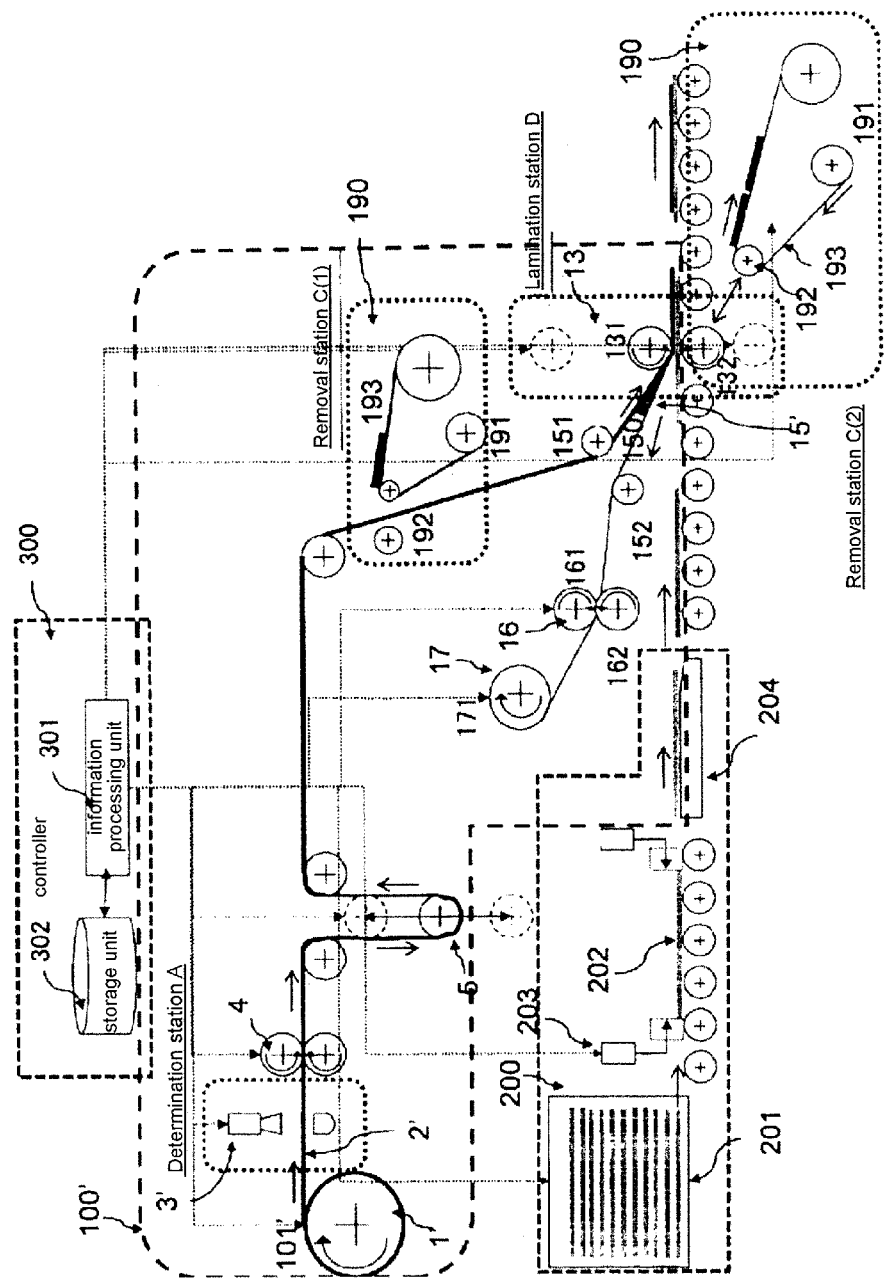
FIG. 15 is a conceptual diagram illustrating a liquid crystal display device continuous manufacture apparatus disclosed in the Patent Document 2, which has no need for the cutting station B, wherein the apparatus is configured to identify a defect-free normal sheet and a defect-containing defective sheet of a polarizing sheet preliminarily formed based in defect position information detected through a preliminary inspection, by a determination device in a determination station A.

As is evidenced from FIG. 12, with the base member having a thickness of 213 μm, perfect peeling could be achieved if the curvature radius R is equal to or less than 22.5 mm. However, if the curvature radius R is increased to 25.0 mm, the peeling becomes incomplete or impossible. With the base member having a thickness of 131 μm, perfect peeling could be achieved if the curvature radius R is equal to or less than 7.5 mm, however, if the curvature radius R is increased to 10.0 mm, the peeling becomes incomplete or impossible. In the case of the base member having a thickness of 38 μm, perfect peeling could be achieved if the curvature radius R is equal to or less than 1.5 mm, however, if the curvature radius R is increased to 2.0 mm, the peeling becomes incomplete or impossible. FIG. 13 illustrates the relationship between the thickness of the base member and the limit of R causing failure of peeling. Specifically, with respect to the curved line illustrated in FIG. 13, the base material having an adhesive layer formed thereon cannot be peeled when it is in a region above the line. On the other hand, the base material having an adhesive layer formed thereon can be peeled if it is in the region below the curved line. In other words, this curve provides a peelability threshold line.

(Concave Support Member Corresponding to Turning Member Having Cross-sectionally Arc-shaped Surface)

Referring to FIG. 1, it is noted that there are provided in accordance with the first embodiment of the present invention concave support members 143, 144 at positions respectively corresponding to the turning members 141, 142 for holding a defective polarizing film sheet Xβ being transported around the turning members 141, 142 in the state carried on the carrier film Z, in cooperation with the convex surfaces of the turning members 141, 142 when the sheet path changing device 14 is brought into cooperation with the strip-shaped film laminate supply apparatus 100. Referring to FIG. 4, there is provided in accordance with the second embodiment of the present invention a concave support member 148 at a position corresponding to the cross-sectionally arc-shaped convex surface of the turning member 145, for holding a defective polarizing film sheet Xβ being transported around the cross-sectionally arc-shaped convex surface of the turning member 145 in the state carried on the carrier film Z, in cooperation with the cross-sectionally arc-shaped convex surface of the turning member 145 when the sheet path changing device 14 is brought into cooperation with the strip-shaped film laminate supply apparatus 100. Referring further to FIG. 7, there is provided in accordance with the third embodiment of the present invention a concave support member 1493 at a position corresponding to the turning member 149, for holding a defective polarizing film sheet Xβ being transported around the turning member 149 in the state carried on the carrier film Z, in cooperation with the turning member 149 when the sheet path changing device 14 is brought into cooperation with the strip-shaped film laminate supply apparatus 100. It is desirable to determine the peeling force of the carrier film with respect to the adhesive layer on the polarizing film, to a value slightly less than the adhesive force of the adhesive layer with respect to the polarizing film, or in other words, the carrier film can be peeled from the adhesive layer more easily than the polarizing layer, but the above concave support portion is intended to avoid unexpected peeling of the defective sheet Xβ even with such a setting.

As discussed above, the method and apparatus of the present invention makes it possible to control a plurality of means, devices or units making up the entire apparatus in cooperative association with each other to reliably supply the strip-shaped film laminate without possible occurrence of slacking. This prevents the occurrence of slacking and excessive tensioning during feeding of the strip-shaped film laminate. In other words, this prevents the occurrence of twist and tangle in the strip-shaped film laminate. This also prevents displacement of the polarizing film sheets X. Thus, only the normal sheet Xα in the polarizing film sheets X can be reliably peeled from the carrier film Z, and, after being fed to the lamination position, can be positionally aligned with a liquid crystal panel W so as to steadily start the lamination operation to continuously fabricate liquid crystal display devices. As will be understood, the defective sheet Xβ in the polarizing film sheets X can also be reliably taken away in the state adhered to the carrier film Z without being peeled from the carrier film Z.

EXPLANATION OF CODES

1: feeding device
2: strip-shaped film laminate
2': cut line-formed strip-shaped film laminate
3, 3': determination device
4: film feeding device
5: speed adjustment device
6: cutting device
7: cutting position checkup device
8: cutting position checkup device
9: film feeding device
10: speed adjustment device
11: film feeding device
111: feed roller A
112: feed roller A
12: tension adjustment device
121: guide roller
122: dancer roller
13: lamination device
131: lamination roller
132: lamination roller
14: sheet path changing device
141: upstream turning roller
142: downstream turning roller
143: upstream support portion
144: downstream support portion
145: turning roller
146: driving unit
147: guide rail
148: support portion
149: turning member
1490: passage
1491: driving unit
1492: guide rail
1493: support portion
15: sheet peeling device
150: cross-sectionally wedge-shaped peeling plate
151: upstream guide roller
152: downstream guide roller
153: driving unit
154: guide rail
16: film feeding device
161: feed roller B
162: feed roller B
17: carrier film take-up device
171: carrier film take-up device
100: strip-shaped film laminate supply apparatus
101: roll of strip-shaped film laminate
200: liquid crystal display supply apparatus
201: liquid crystal display magazine
202: liquid crystal display W
203: liquid crystal panel positioning guide
204: conveyance device
300: controller
301: information processing unit
302: storage unit

What is claimed is:

1. A method for continuously manufacturing liquid crystal display devices, which is adapted to use a strip-shaped film laminate comprising a polarizing film having an adhesive layer formed thereon and being of a width corresponding to one of long and short sides of a rectangular panel, and a carrier film peelably laminated to the adhesive layer, a plurality of transversely extending, longitudinally spaced cut lines being formed in the polarizing film and the adhesive layer, a plurality of polarizing film sheets being defined each between longitudinally adjacent two of the cut lines, each of the polarizing film sheets being classified, based on a defect detected by a preliminary inspection, into either a defect-free normal sheet having a length corresponding to the other of the long and short sides of the rectangular panel, or a defect-containing defective sheet; the method comprising the steps of:

feeding the plurality of polarizing film sheets carried by the carrier film, with respect to a plurality of rectangular panels being sequentially conveyed, sequentially toward a lamination position for lamination to each of the sequentially conveyed rectangular panels;

using a controller provided for determining whether the polarizing film sheet is a normal sheet or a defective sheet and;

when one of the polarizing film sheets is determined as the normal sheet by the controller, positioning a sheet peeling device at a forward, operative position wherein the sheet peeling device acts on the strip-shaped film laminate which is being fed along a first sheet feeding path, to have the normal sheet peeled from the carrier film, and fed to the lamination position so as to laminate the normal sheet to one of the rectangular panels fed to the lamination position in synchronization with the feeding of the normal sheet; and when one of the polarizing film sheets is determined as the defective sheet by the controller, operating a sheet path changing device into an operative position so as to move said sheet peeling device backward apart from the strip-shaped film laminate to thereby direct the strip-shaped film laminate along a second sheet feeding path which bypasses the lamination position, to have the defective sheet fed with the carrier film toward a carrier film take-up position, so that the polarizing film is taken up together with the carrier film, by a predetermined length corresponding to the length of the defective sheet in the feeding direction, wherein operating the sheet path changing device comprises moving each of a plurality of rollers from a first position to a second position.

2. The method as defined in claim 1, wherein the sheet peeling device and the sheet path changing device are configured such that, when one of them is in the operative position, the other is out of the operative position.

3. The method as defined in claim 1, which further comprises the step of, when one of the polarizing film sheets subsequent to the normal sheet is determined as the defective sheet by the controller, releasing the sheet peeling device from the operative position, and operating the sheet path changing device into the operative position, to have the defective sheet to be directed toward the carrier film take-up position, and taken up integrally with the carrier film, by a predetermined length associated with the length of the defective sheet in the feeding direction.

4. The method as defined in any one of claim 1, which further comprises the step of, when one of the polarizing film sheets subsequent to the defective sheet is determined as the normal sheet by the controller, releasing the sheet path changing device from the operative position, and bringing again the sheet peeling device in the operative position, to have the normal sheet peeled from the carrier film, and fed to the lamination position so as to laminate the normal sheet to one of the rectangular panels fed to the lamination position in synchronization with the feeding of the normal sheet.

5. The method as defined in any one of claim 1, wherein a tension adjustment-device is operable to absorb slacking or excessive tension occurring in the feeding of the strip-shaped film laminate when one of the sheet peeling device and the sheet path changing device is released from the operative position.

6. The method as defined in any one of claim 1, wherein, when the sheet peeling device is in the operative position, the sheet peeling device is brought into contact with a reverse surface of the carrier film at a position corresponding to the leading edge of the normal sheet in the polarizing film sheets formed by the cut lines, at an acute angle with respect to the reverse surface, to bend the strip-shaped film laminate, thereby causing the normal sheet to be peeled from the carrier film, and fed to the lamination position to laminate the normal sheet to the rectangular panel.

7. The method as defined in any one of claim 1, wherein, when the sheet path changing device is in the operative position, the sheet path changing device is brought into contact with a reverse surface of the carrier film at a position corresponding to the defective sheet in the polarizing film sheets and along a cross-sectional arc shape, to turn the strip-shaped film laminate along the cross-sectional arc shape, thereby causing the defective sheet in the polarizing film sheet to be directed toward the carrier film take-up position in the state wherein it is integrally attached to the carrier film, and fed by a predetermined length associated by the length of the defective sheet in the feeding direction.

8. The method as defined in claim 7, wherein the cross-sectional arc shape has a curvature radius R which is set to prevent the defective sheet from being peeled from the carrier film, under the relative relationship between the thickness of the polarizing film sheet, and the peeling force of the carrier film with respect to the adhesive layer on the polarizing film sheet.

9. The method as defined in claim 7, wherein, when the sheet path changing device is in the operative position, cooperatively associating the sheet path changing device with support device having a surface corresponding to the cross-sectional arc shape, at a position for turning the strip-shaped film laminate along the cross-sectional arc shape, so as to prevent the defective sheet from being peeled from the carrier film.

10. The method of claim 1, wherein operating the sheet path changing device comprises moving a first roller of the plurality of rollers from a position contacting the strip-shaped film laminate to a position spaced from the strip-shaped film laminate.

11. The method of claim 1, wherein operating the sheet path changing device comprises moving a first roller of the plurality of rollers in a first direction and moving a second roller of the plurality of rollers in a second direction different from the first direction.

12. The method of claim 1, wherein operating the sheet path changing device comprises moving a first roller of the plurality of rollers from a position spaced from the strip-shaped film laminate to a position contacting the strip-shaped film laminate.

13. The method of claim 1, wherein operating the sheet path changing device comprises moving at least three rollers of the plurality of rollers.

14. An apparatus for continuously manufacturing liquid crystal display devices which is adapted to use a strip-shaped film laminate comprising a polarizing film having an adhesive layer formed thereon and being of a width corresponding to one of long and short sides of a rectangular panel, and a carrier film peelably laminated to the adhesive layer, a plurality of transversely extending, longitudinally spaced cut lines being formed in the polarizing film and the adhesive layer, a plurality of polarizing film sheets being defined each between longitudinally adjacent two of the cut lines, each of the polarizing film sheets being classified, based on a defect position detected by a preliminary inspection, into either a defect-free normal sheet having a length corresponding to the other of the long and short sides of the rectangular panel, or a defect-containing defective sheet; the apparatus comprising:

a strip-shaped film laminate feeding device for feeding the plurality of polarizing film sheets in a state carried by the carrier film, with respect to a plurality of rectangular panels being sequentially conveyed, sequentially toward a lamination position for lamination to each of the sequentially conveyed rectangular panels;

the strip-shaped film laminate feeding device at least including a feed out device, a take-up device and a tension adjustment device which are cooperated each other for feeding the laminate in a manner that slacking in the strip-shaped film laminate is prevented or suppressed;

a controller provided for determining whether each of the polarizing film sheets is the normal sheet or the defective sheet, before the polarizing film sheet reaches the lamination position;

a sheet peeling device operable, when one of the polarizing film sheets is determined as the normal sheet by the controller, to have the normal sheet peeled from the carrier film, and fed to the lamination position;

a lamination device adapted to be driven in association with the strip-shaped film laminate feeding device to laminate the normal sheet to one of the rectangular panels fed to the lamination position in synchronization with the feeding of the normal sheet;

a sheet path changing device adapted to be cooperatively associated with the strip-shaped film laminate feeding device, and operable, when one of the polarizing film sheets is determined as the defective sheet by the controller, to have the defective sheet to be directed toward a carrier film take-up position different from the lamination position, and taken up integrally with the carrier film, by a predetermined length corresponding to the length of the defective sheet in the feeding direction, wherein the sheet path changing device comprises a plurality of rollers and each roller of the plurality of roller is movable from a first position to a second position in response to a determination of a defective sheet; and the controller also for operating the strip-shaped film laminate feeding device, the controller, the sheet peeling device, the sheet path changing device and the lamination device in cooperative association with each other.

15. The apparatus as defined in claim 14, wherein the sheet peeling device and the sheet path changing device are configured such that, when one of them is in an operative position cooperatively associated with the strip-shaped film laminate feeding device, the other is released from the cooperative association with the strip-shaped film laminate feeding device.

16. The apparatus as defined in claim 14, wherein the tension adjustment device is operable to absorb slacking or excessive tensioning occurring in the feeding of the strip-shaped film laminate when one of the sheet peeling device and the sheet path changing device is released from the cooperative association with the strip-shaped film laminate feeding device.

17. The apparatus as defined in any one of claims 14, wherein the sheet peeling device comprises a cross-sectionally wedge-shaped peeling plate adapted, when the sheet peeling device is cooperatively associated with the strip-shaped film laminate feeding device, to be brought into contact with a reverse surface of the carrier film at a position corresponding to the leading edge of the normal sheet in the polarizing film sheets formed by the cut lines, to bend the strip-shaped film laminate, thereby causing the normal sheet to be peeled from the carrier film, and fed to the lamination position, the peeling plate having at least a width equal to that of the strip-shaped film laminate.

18. The apparatus as defined in any one of claims 14, wherein the sheet path changing device comprises a turning member adapted, when the sheet path changing device is cooperatively associated with the strip-shaped film laminate feeding device, to be brought into contact with a reverse surface of the carrier film at a position corresponding to the defective sheet in the polarizing film sheets formed by the cut lines, to turn the strip-shaped film laminate along a cross-sectional arc shape, thereby causing the defective sheet to be directed toward the carrier film take-up position integrally with the carrier film, and fed by a predetermined length associated with the length of the defective sheet in the feeding direction, the turning member having a cross-sectionally arc-shaped surface having at least a width equal to that of the strip-shaped film laminate.

19. The apparatus as defined in claim 18, wherein the cross-sectionally arc-shaped surface of the turning member has a curvature radius R which is of a value capable of preventing the defective sheet from being peeled from the carrier film, in relation to the thickness of the polarizing film sheet, and the peeling force of the carrier film with respect to the adhesive layer on the polarizing film sheet.

20. The apparatus as defined in claim 18, wherein the sheet path changing device is adapted, when it is cooperatively associated with the strip-shaped film laminate feeding device, to be cooperatively associated with a concave support portion having a surface corresponding to the cross-sectionally arc-shaped surface of the turning member, at a position for turning the strip-shaped film laminate along the cross-sectional arc, so as to prevent the defective sheet from being peeled from the carrier film.

* * * * *